United States Patent
Nakamura

(10) Patent No.: US 6,602,648 B2
(45) Date of Patent: Aug. 5, 2003

(54) IMAGE-FORMING MATERIAL AND PLANOGRAPHIC PRINTING ORIGINAL PLATE USING SAME

(75) Inventor: Ippei Nakamura, Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 163 days.

(21) Appl. No.: 09/791,717

(22) Filed: Feb. 26, 2001

(65) Prior Publication Data

US 2002/0028404 A1 Mar. 7, 2002

(30) Foreign Application Priority Data

Mar. 1, 2000 (JP) ......... 2000-055565

(51) Int. Cl.⁷ ......... G03F 7/038; G03F 7/039
(52) U.S. Cl. ......... 430/270.1; 430/281.1; 430/286.1; 430/348; 430/944; 430/945; 430/964
(58) Field of Search ......... 430/270.1, 281.1, 430/286.1, 302, 348, 944, 945, 964

(56) References Cited

U.S. PATENT DOCUMENTS

| | | | |
|---|---|---|---|
| 5,576,443 A | | 11/1996 | Fabricius et al. |
| 6,124,425 A | * | 9/2000 | Nguyen ......... 528/422 |
| 6,132,933 A | * | 10/2000 | Nguyen ......... 430/272.1 |
| 6,177,182 B1 | * | 1/2001 | Nguyen ......... 428/319.3 |
| 2002/0086250 A1 | * | 7/2002 | Katoh et al. ......... 430/574 |
| 2002/0155400 A1 | * | 10/2002 | Takizawa ......... 430/574 |

FOREIGN PATENT DOCUMENTS

| | | | | |
|---|---|---|---|---|
| EP | 0911153 | | 4/1999 | |
| EP | 0913253 | | 5/1999 | |
| EP | 0914941 | | 5/1999 | |
| EP | 0914964 | | 5/1999 | |
| EP | 0938972 | | 9/1999 | |
| EP | 0945264 | | 9/1999 | |
| EP | 0956948 | | 11/1999 | |
| JP | 8-95197 | | 4/1996 | |
| JP | 11-65016 | * | 3/1999 | ......... G03C/1/12 |
| JP | 11-095415 | | 4/1999 | |
| JP | 2000-231172 A | * | 8/2000 | ......... G03C/1/12 |
| JP | 2002-82404 A | * | 3/2002 | ......... G03C/1/12 |

* cited by examiner

Primary Examiner—Janet Baxter
Assistant Examiner—Barbara Gilliam
(74) Attorney, Agent, or Firm—Burns, Doane, Swecker & Mathis, LLP

(57) ABSTRACT

An image-forming material which has high sensitivity and is excellent in image-forming performance and which does not produce smudges on an optical system of an exposing apparatus, and a planographic printing original plate which uses this image-forming material and can produce images by an infrared laser for a direct plate-making process. These can be achieved by an image-forming material containing an infrared absorber having in the same molecule thereof two or more chromophoric groups which can absorb infrared radiation and are each bonded by a covalent bond.

10 Claims, No Drawings

IMAGE-FORMING MATERIAL AND PLANOGRAPHIC PRINTING ORIGINAL PLATE USING SAME

BACKGROUND OF THE INVENTION

1. Field of the Invention

The present invention relates to a positive-type or negative-type image-forming material in which images can be recorded by exposure to an infrared laser, characterized in that solubility of exposed portions of a recording layer changes or hydrophilicity and hydrophobicity of the exposed portions of the recording layer change, and relates to a planographic printing original plate using the material. Further, the present invention relates to an image-forming material for use with an infrared laser, which is writable by exposure to near-infrared region light from an infrared laser or the like and is suitable for use in a planographic printing original plate that can be prepared by a so-called direct plate-making process, enabling the plate to be imaged directly according to digital signals, particularly from a computer or the like, and relates to a planographic printing original plate using the material.

2. Description of the Related Art

In recent years, owing to progress in technologies related to solid-state lasers and semiconductor lasers that emit rays in regions ranging from the near-infrared region to the infrared region, a system, which uses these infrared lasers in a printing plate-making process so that a printing plate is prepared directly according to digital data from a computer has drawn attention.

Japanese Patent Application Laid-Open (JP-A) No. 7-285275 discloses a material for a positive-type planographic printing plate for use with an infrared laser in direct plate-making. That invention relates to an image-forming material comprising a resin soluble in an aqueous alkaline solution, a substance capable of generating heat by absorbing light, and a positive-type photosensitive compound such as a quinonediazide, wherein at image portions the positive-type photosensitive compound acts as a dissolution inhibiting agent which substantially reduces the solubility of the resin soluble in the aqueous alkaline solution, and at non-image portions the positive-type photosensitive compound is thermally decomposed to thereby lose the dissolution inhibiting capability, and the image-forming material can be removed by a development treatment to form an image.

After studies, the present inventors have found that a positive image can be obtained without the addition of a quinonediazide to an image-recording material. However, mere elimination of the quinonediazide from the image recording material presents a drawback that the stability of sensitivity with respect to concentration of a developing solution, i.e., latitude in development, becomes poor.

Meanwhile, onium salts and compounds capable of forming alkali-insoluble hydrogen bonds are known to act as an agent which inhibits a polymer soluble in an aqueous alkaline solution from being dissolved by the alkali. With regard to an image-forming material for use with an infrared laser, WO 97/39,894 describes that a composition which uses a cationic infrared absorbing dye as an agent for inhibiting the polymer soluble in an aqueous alkaline solution from being dissolved exhibits a positive-working phenomenon. This positive working is that the infrared absorbing dye absorbs the laser light and generates heat which deprives a polymeric film in an irradiated region of dissolution inhibition, to thereby form an image.

However, this invention is associated with a problem that, although image-forming performance of the photosensitive composition at a surface irradiated with a laser is satisfactory, a satisfactory effect cannot be obtained deeper in the photosensitive material, because of diffusion of heat. As a result, an on-off distinction between exposed areas and unexposed areas is insufficient in a developing process with alkali. Consequently, a good image was not obtained (i.e., sensitivity was low and latitude in development was narrow). The term "latitude in development" as used herein means the broadness, when the alkali concentrations varies, of a range of the alkali concentrations of an alkaline developing solution allowable for the creation of a good image.

An increase of exposure amount in order to obtain sufficient latitude in development is associated with the problem that ablation of the infrared absorber or other components in the photosensitive layer occurs and, as a result, smudges are formed on an optical system of an exposing apparatus.

SUMMARY OF THE INVENTION

Accordingly, an object of the present invention is to provide an image-forming material which has high sensitivity and is excellent in image-forming performance and does not produce smudges on an optical system of an exposing apparatus. A further object of the present invention is to provide a planographic printing original plate which uses the material and which can form images by an infrared laser for a direct plate-making process.

After a series of studies for the purpose of raising sensitivity and image-forming performance, the present inventors found that the use of a specific infrared absorber makes it possible to raise both the sensitivity and image-forming performance and to inhibit ablation of the infrared absorber. Based on these findings, the inventors have achieved the present invention.

A first aspect of the present invention is an image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond.

A second aspect of the present invention is characterized by, in the image-forming material according to the first aspect of the present invention, wherein one of the chromophoric groups has an absorption peak at a wavelength in the range of 720 to 1200 nm.

A third aspect of the present invention is characterized by, in the image-forming material according to the first aspect of the present invention, further comprising a polymeric compound insoluble in water and soluble in an aqueous alkaline solution, wherein image recording can be effected by utilizing a change of solubility of the polymeric compound in the aqueous alkaline solution.

A fourth aspect of the present invention is characterized by, in the image-forming material according to the first aspect of the present invention, further comprising a radical generator which is caused to generate a radical by at least heat, and a polymerizable compound which reacts with the radical in a radical polymerization reaction, wherein image recording can be effected by utilizing curing caused by the radical polymerization reaction of the polymerizable compound.

A fifth aspect of the present invention is characterized by, in the image-forming material according to the first aspect of the present invention, further comprising an acid-generating agent which is caused to generate an acid by at least heat, and a compound which crosslinks, with the acid acting as a catalyst for a crosslinking reaction, wherein image recording can be effected by utilizing a decrease of alkali-solubility of the image-forming material.

A sixth aspect of the present invention is characterized by, in the image-forming material according to the first aspect of the present invention, further comprising an acid-generating agent which is caused to generate an acid by at least heat, and a compound that severs a chemical bond, with the generated acid acting as a catalyst for a bond cleaving reaction, wherein image recording can be effected by utilizing an increase of alkali-solubility of the image-forming material.

A seventh aspect of the present invention is characterized by, in the image-forming material according to the first aspect of the present invention, further comprising a polarity switchable material whose hydrophilicity and hydrophobicity are changed by at least heat, wherein image recording can be effected by utilizing change of the hydrophilicity and hydrophobicity of the image-forming material.

A eighth aspect of the present invention is characterized by, in the image-forming material according to the first aspect of the present invention, wherein the infrared radiation absorber is represented by the following general formula I:

General formula I $(D)_n$–A wherein A represents an organic group having a valency of at least 2; n represents an integer of at least 2; and D represents a chromophoric group having absorption in an infrared region, wherein one of the chromophoric groups may be the same as and may be different from another of the chromophoric groups; and, in a case where the chromophoric group has an electric charge, an ion having an electric charge opposite to the electric charge of the chromophoric group may be present in order to neutralize the electric charge of the chromophoric group.

A ninth aspect of the present invention is characterized by, in the image-forming material according to the eighth aspect of the present invention, wherein the chromophoric groups are the same as each other.

A tenth aspect of the present invention is characterized by, in the image-forming material according to the first aspect of the present invention, wherein the infrared radiation absorber is included in a proportion of from 0.01 to 50% by weight with respect to total weight of solid components of the image-forming material.

A eleventh aspect of the present invention is characterized by, in the image-forming material according to the first aspect of the present invention, wherein the infrared radiation absorber is included in a proportion of from 0.1 to 20% by weight with respect to total weight of solid components of the image-forming material.

A twelfth aspect of the present invention is characterized by, in the image-forming material according to the first aspect of the present invention, wherein the infrared radiation absorber is included in a proportion of from 0.5 to 15% by weight with respect to total weight of solid components of the image-forming material.

Although the mechanism of the present invention is not clear, it is presumed to be as follows. Because an infrared absorber having in the same molecule thereof two or more chromophoric groups is used as the infrared absorber, the presence of the two or more chromophoric groups that are adjacent to each other localizes the distribution of a dye, and locally creates a portion which reaches a high temperature. Further, because the linkage of the chromophoric groups causes the dye to form a state of association and quickens a relaxing process from an excited state, the amount of generated heat increases. Presumably, these effects make it possible to achieve high sensitivity and improvement of image-forming performance.

In addition, in comparison with an infrared absorber having only one chromophoric group, the molecular weight of the infrared absorber having two or more chromophoric groups is larger and, as a result, scattering by ablation due to heat generation at a time of exposure can be inhibited.

The chromophoric groups represented by D are preferably bonded by covalent bonds. Since the chromophoric groups bonded by covalent bonds are not dissociated even after being dissolved in a solvent of a coating liquid for forming a recording layer, an increase of distance between the chromophoric groups, by salt exchange with other salt compounds in the coating liquid, does not occur. This brings about the advantage that the effect of the chromophoric groups does not diminish when a recording layer of a planographic printing original plate is formed from the image-forming material.

A thirteen aspect of the present invention is a planographic printing original plate comprising a substrate, and a recording layer provided on the substrate, the recording layer containing an image-forming material capable of recording an image by infrared exposure, the image-forming material containing an infrared radiation absorber having in a molecule thereof at least two chromophoric groups, each of which can absorb an infrared ray and is bonded to another portion of the molecule by a covalent bond.

DESCRIPTION OF THE PREFERRED EMBODIMENST

The present invention is explained in detail below.

A. Image-Forming Material

The image-forming material of the present invention is characterized in that it contains at least an infrared absorber having in a molecule thereof at least two chromophoric groups, each of which can absorb the infrared radiation and is bonded to other portion of the molecule bonded by the covalent bonds.

Infrared Absorbers

The infrared absorber for use in the present invention is characterized in that it has in a same molecule thereof at least two chromophoric groups and each of the chromophoric group is bonded to another portion of the molecule.

The infrared absorber is preferably an infrared absorber represented by the general formula (I).

General formula (I)

$(D)_n$–A wherein A represents an organic group having a valency of at least 2; n represents an integer of at least 2; and D represents a chromophoric group having absorption in an infrared region, wherein one of the chromophoric groups may be the same as and may be different from another of the chromophoric groups; and, in a case where the chromophoric group has an electric charge, an ion having an electric charge opposite to the electric charge of the chromophoric group may be present in order to neutralize the electric charge of the chromophoric group.

Although the chromophoric groups represented by D may be the same or different, an infrared absorber whose chromophoric groups have the same structure can be more easily prepared from the standpoint of synthesis.

Similarly to an infrared absorber contained in a conventional recording material capable of forming an image by exposure to the infrared region, the function of the infrared absorber contained in the image-forming material of the present invention is to generate heat by infrared exposure so that recording is made by the heat thus generated. For this reason, the image-forming material of the present invention needs to contain an infrared absorber capable of efficiently converting light of an infrared laser into heat. The chromophoric groups of the infrared absorber to be used herein have absorption in an infrared region. More specifically, the chromophoric groups have absorption in a region ranging from 720 nm to 1200 nm and preferably have absorption peaks in the region ranging from 720 nm to 1200 nm.

The infrared absorber having in the same molecule thereof two or more chromophoric groups is explained in detail by specific examples thereof. In the following exemplary compounds (IR-1)~(IR-51), basic skeletons, organic groups (expressed as $A^1 \sim A^{12}$) which each correspond to A, which functions as a linking group in the formula (I), substituents (expressed as $R^1 \sim R^4$) which are each present in a chromophoric group, and counter ions $X^-$ due to an electric charge borne by the chromophoric groups are indicated specifically. However, it should be noted that the present invention is not limited to these compounds.

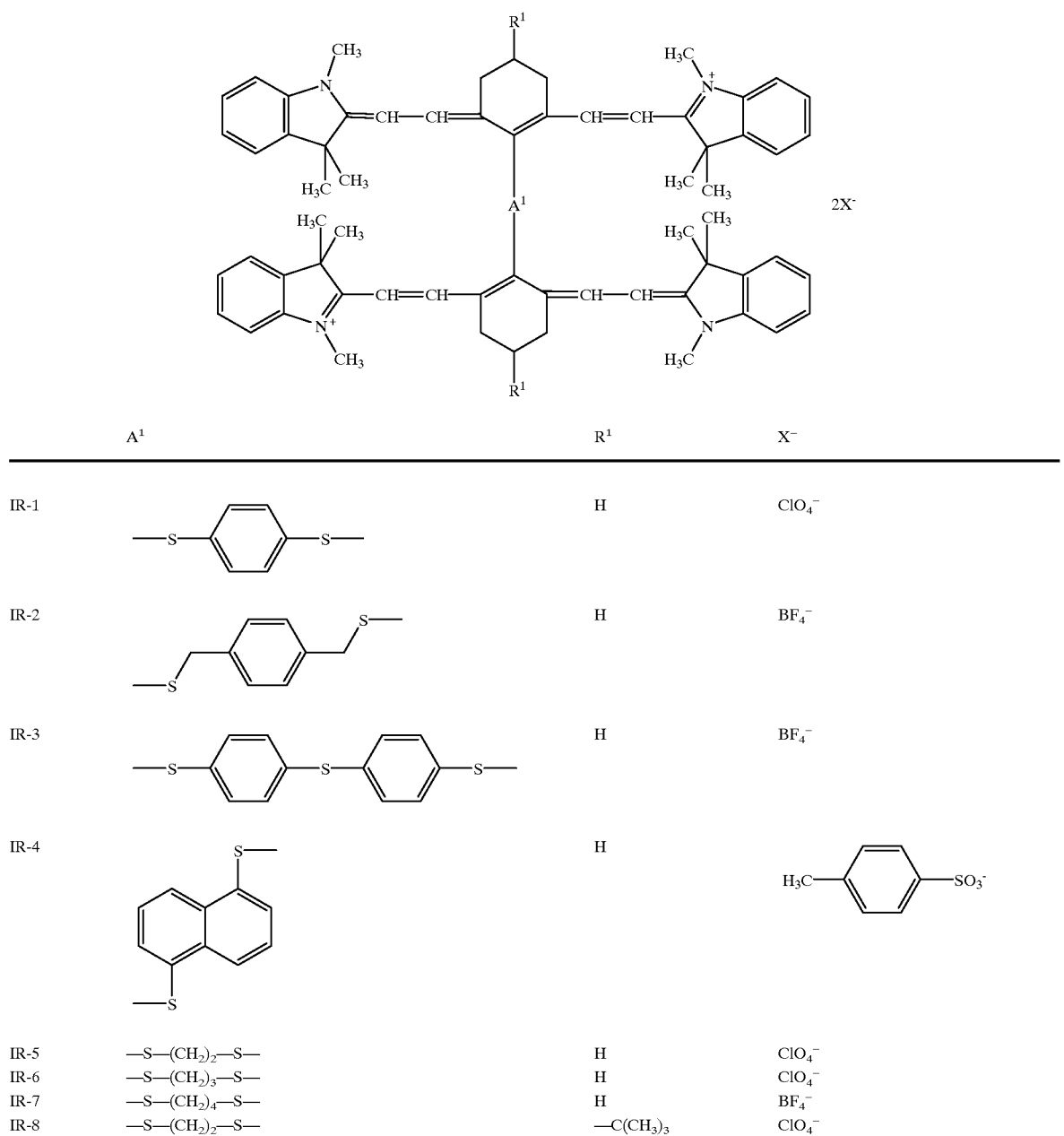

-continued

| | | | |
|---|---|---|---|
| IR-9 | —O—(C₆H₄)—O— | H | I⁻ |
| IR-10 | —NH—(C₆H₄)—NH— | H | ClO₄⁻ |
| IR-11 | —NH—(CH₂)₂—NH— | H | ClO₄⁻ |
| IR-12 | —S—(thiadiazole)—S— | H | ClO₄⁻ |

| | $A^2$ | $R^2$ | $X^-$ |
|---|---|---|---|
| IR-13 | —S—(C₆H₄)—S— | H | H₃C—C₆H₄—SO₃⁻ |
| IR-14 | —S—(CH₂)₃—S— | H | H₃C—C₆H₄—SO₃⁻ |
| IR-15 | —S—(CH₂)₄—S— | —C(CH₃)₃ | ClO₄⁻ |
| IR-16 | —O—(C₆H₄)—O— | H | I⁻ |
| IR-17 | —NH—(C₆H₄)—NH— | H | ClO₄⁻ |
| IR-18 | —S—(thiadiazole)—S— | H | ClO₄⁻ |

-continued
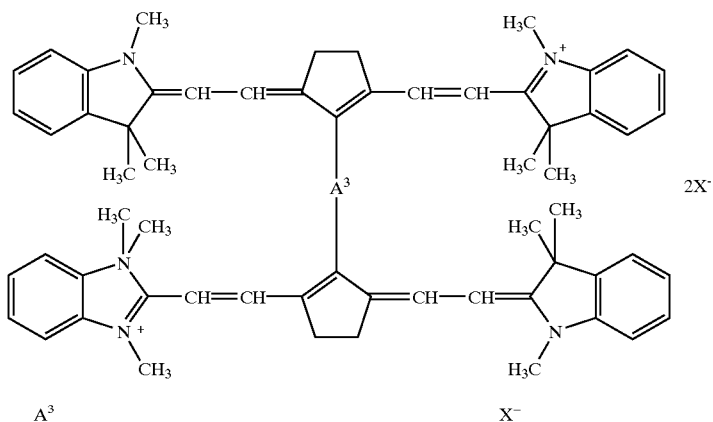
| | $A^3$ | $X^-$ |
|---|---|---|
| IR-19 | 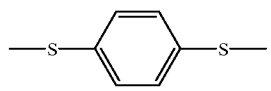 | $ClO_4^-$ |
| IR-20 | $-S-(CH_2)_3-S-$ | 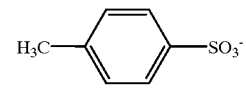 |
| IR-21 | $-S-(CH_2)_4-S-$ | $ClO_4^-$ |
| IR-22 | 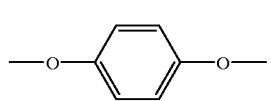 | $I^-$ |
| IR-23 | 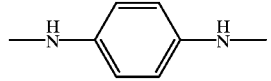 | $ClO_4^-$ |
| IR-24 | 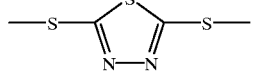 | $ClO_4^-$ |
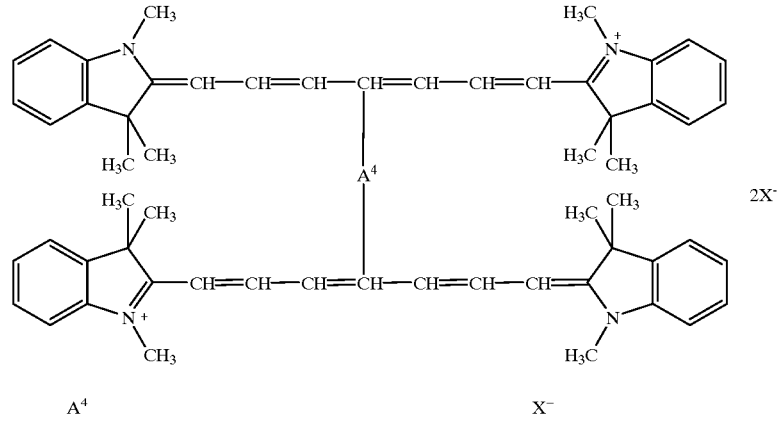
| | $A^4$ | $X^-$ |
|---|---|---|
| IR-25 |  | $ClO_4^-$ |

-continued
| | | |
|---|---|---|
| IR-26 | —S—(CH₂)₃—S— | 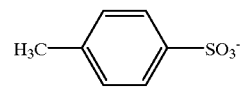 |
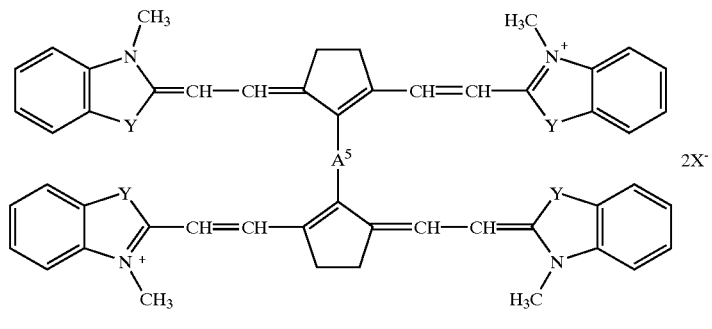
| | $A^5$ | Y | $X^-$ |
|---|---|---|---|
| IR-27 | 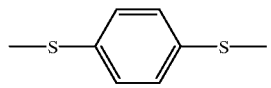 | S | $ClO_4^-$ |
| IR-28 |  | S | $ClO_4^-$ |
| IR-29 | 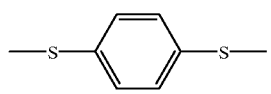 | O | $ClO_4^-$ |
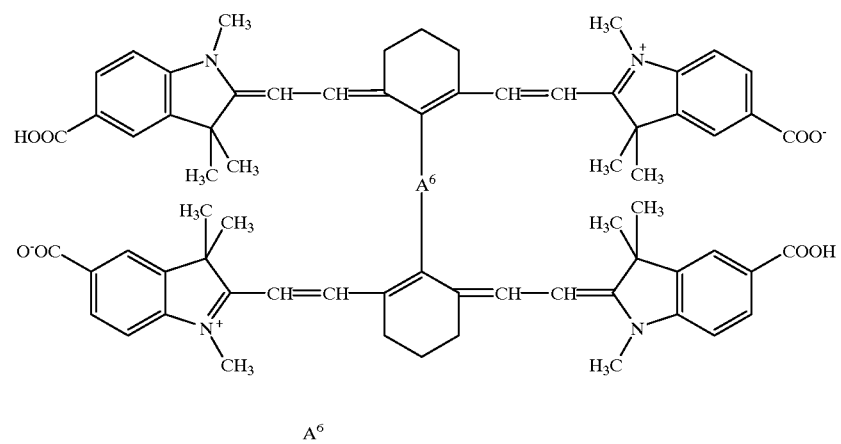
| | $A^6$ |
|---|---|
| IR-30 | 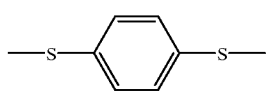 |
| IR-31 | —S—(CH₂)₂—S— |

-continued
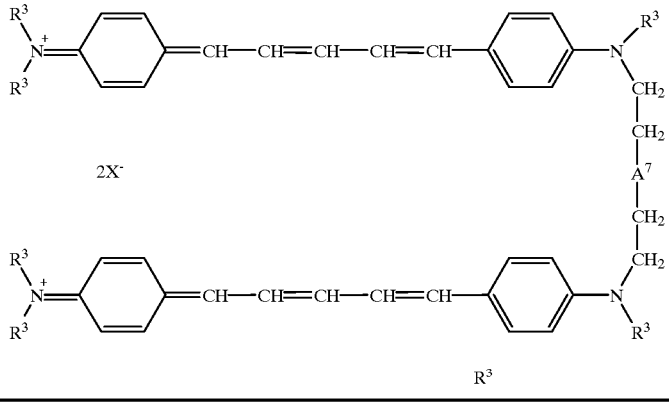
2X⁻
| | $A^7$ | $R^3$ | $X^-$ |
|---|---|---|---|
| IR-32 | —O—C(=O)—(CH₂)₃—C(=O)—O— | C₂H₅ | ClO₄⁻ |
| IR-33 | —O—C(=O)—(CH₂)₄—C(=O)—O— | C₂H₅ | ClO₄⁻ |
| IR-34 | —O—C(=O)—C₆H₄—C(=O)—O— | CH₃ | ClO₄⁻ |
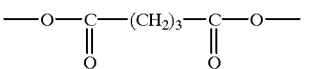
2X⁻
| | $A^8$ | $R^4$ | n | $X^-$ |
|---|---|---|---|---|
| IR-35 | —O—C(=O)—(CH₂)₃—C(=O)—O— | C₂H₅ | 2 | ClO₄⁻ |
| IR-36 | —O—C(=O)—(CH₂)₄—C(=O)—O— | C₂H₅ | 2 | ClO₄⁻ |
| IR-37 | —O—C(=O)—C₆H₄—C(=O)—O— | CH₃ | 2 | ClO₄⁻ |
| IR-38 | —O—C(=O)—(CH₂)₃—C(=O)—O— | C₂H₅ | 3 | ClO₄⁻ |
| IR-39 | —O—C(=O)—NH—(CH₂)₅—NH—C(=O)—O— | C₂H₅ | 3 | BF₄⁻ |

| | | | |
|---|---|---|---|
| IR-40 | 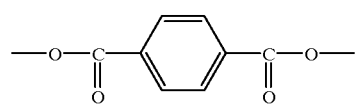 | CH₃  3 | BF₄⁻ |
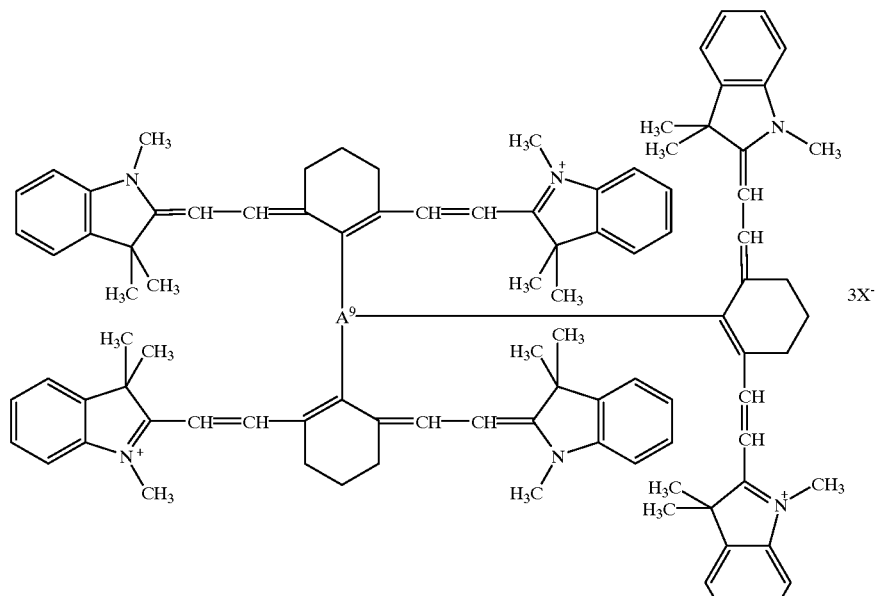
| A⁹ | X⁻ |
|---|---|
| | | |
|---|---|---|
| IR-41 | 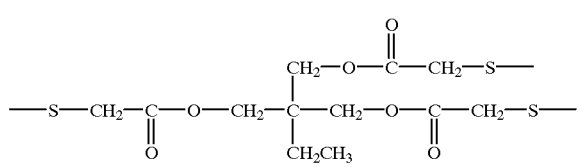 |  |
| IR-42 | 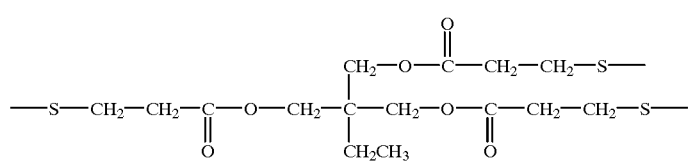 | ClO₄⁻ |

-continued
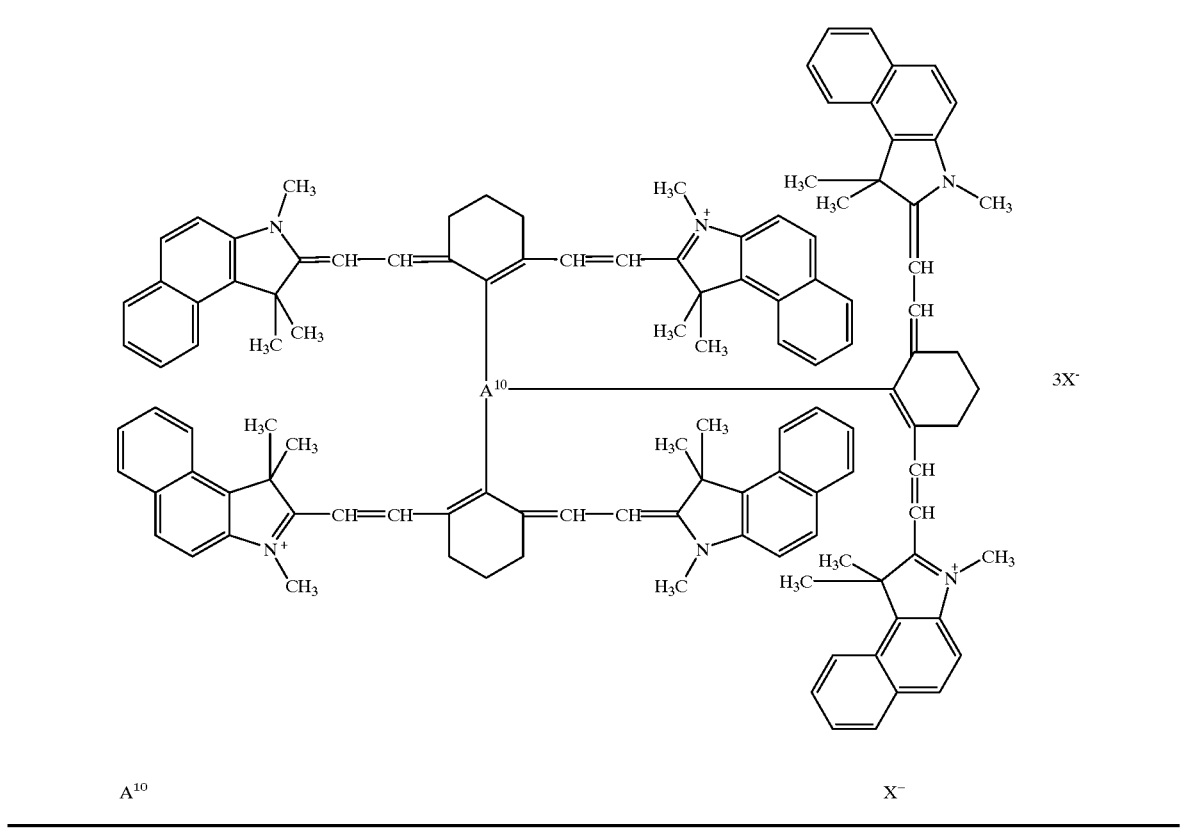
| | $A^{10}$ | $X^-$ |
|---|---|---|
| IR-43 | | |
| IR-44 | | |
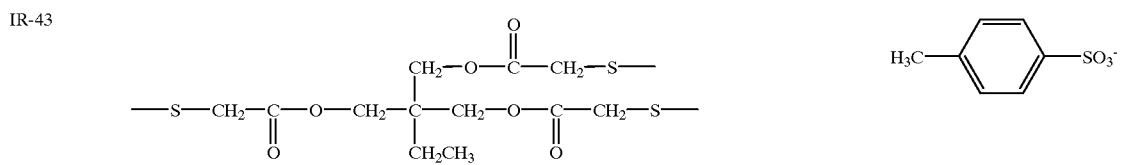

-continued
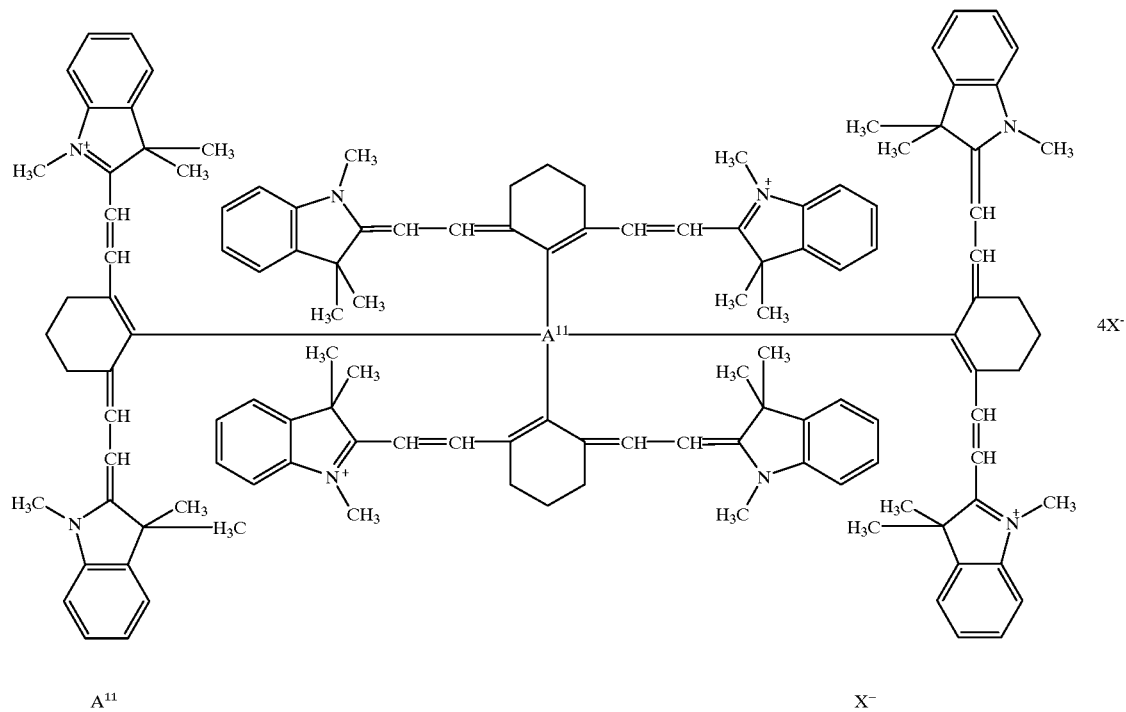
A[11]    X[-]
IR-45 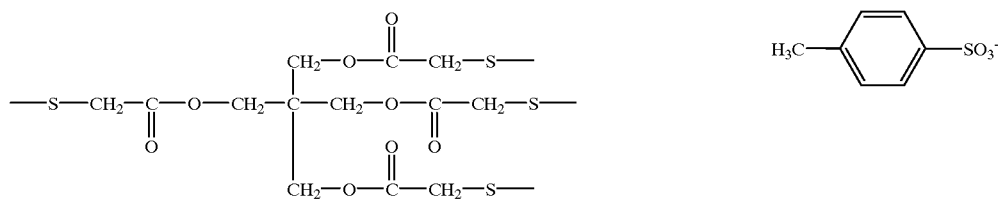
IR-46 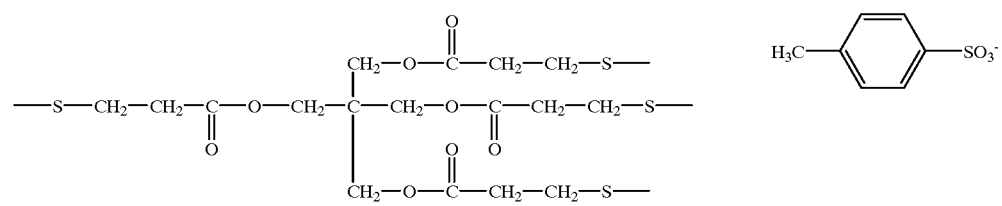

-continued
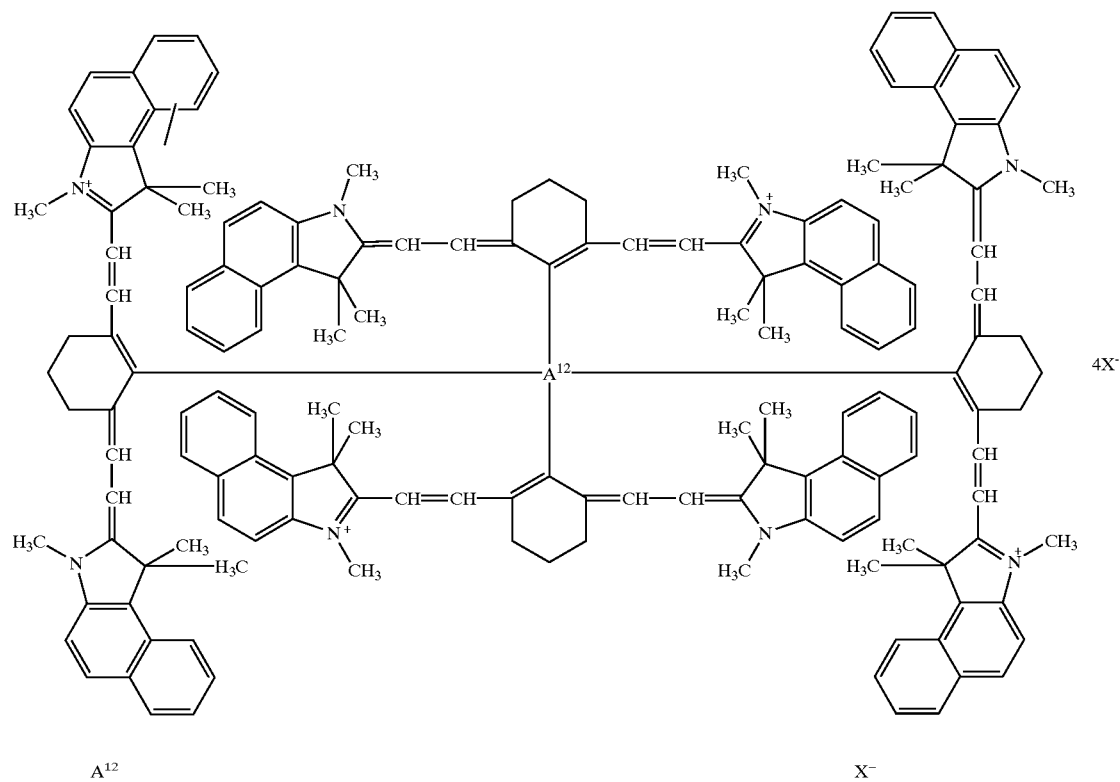
A[12]   X[-]
IR-47 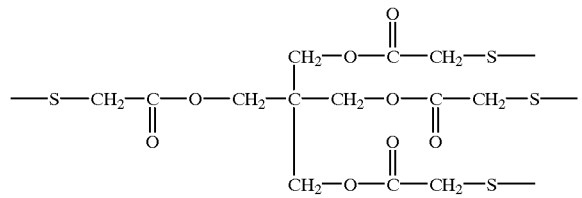 
IR-48 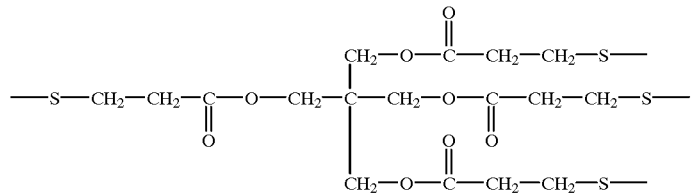 
IR-49 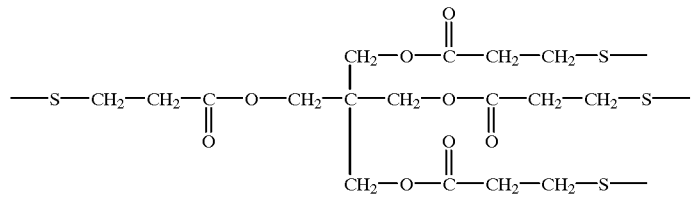 ClO$_4^-$

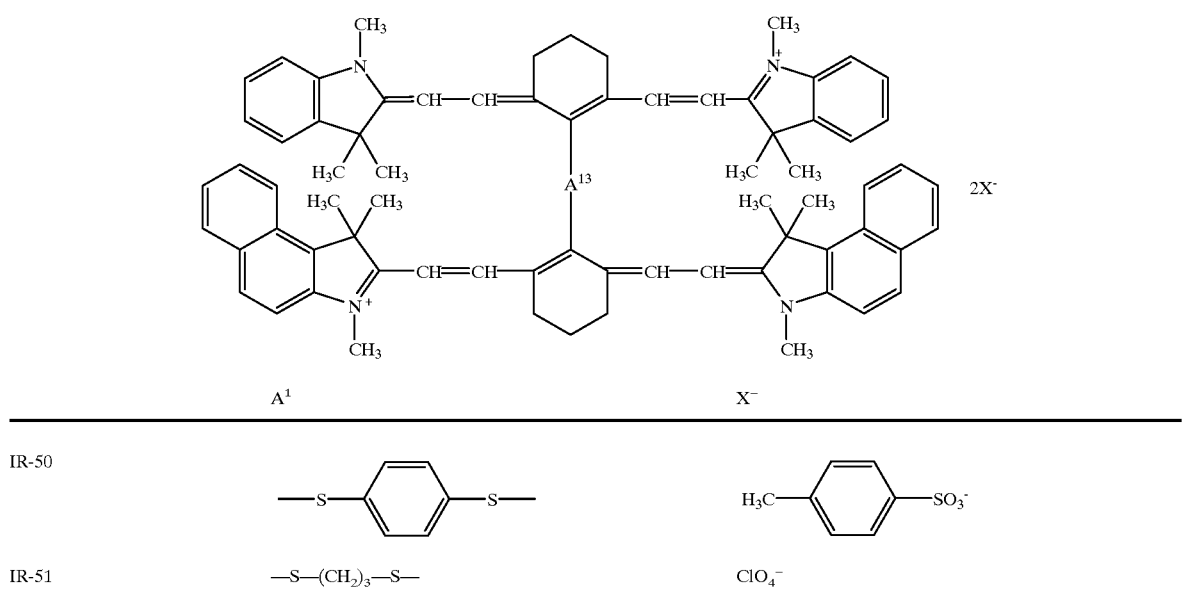

Of these compounds, although synthesis of exemplary compounds (IR-1)~(IR-49), whose two chromophoric groups are the same, is easy, the chromophoric groups may be different from each other, as shown in exemplary compounds (IR-50)~(IR-51).

Next, a method of making the infrared absorbers described above is explained.

The infrared absorbers represented by the general formula (I) can be prepared according to conventionally known techniques of organic synthesis. More specifically, synthesis can be carried out according to a synthesis method described, for example, in JP-A No. 8-95197 and Japanese Patent No. 2758136. In cases where the organic group (A) has a valency of 3 or more, it is not necessary that all link sites are linked to dye portions, and a mixture of compounds having 2 or more linked dye portions can be used.

The infrared absorber may be added to the image-forming material such that the infrared absorber is added together with other components to the image-forming layer. Alternatively, the infrared absorber may be added to a layer that is formed when a planographic printing original plate is prepared other than the recording layer.

In the present invention, the amount to be added of the infrared absorber is 0.01 to 50% by weight, preferably 0.1 to 20% by weight, and more preferably 0.5 to 15% by weight, based on weight of total solids of the image-forming material. If the amount added is less than 0.01% by weight, the image-forming performance becomes worse, whereas if the amount added is more than 50% by weight, non-image portions may be smudged when the material is used as the recording layer of the planographic printing original plate.

In addition to the infrared absorber, the image-forming material of the present invention may contain a pigment or dye capable of absorbing infrared radiation, in order to improve the image-forming performance.

Pigments suitable for use in the present invention may be commercially available pigments and the pigments described in "Color Index (C.I.) Handbook", "Latest Pigment Handbook" (Saishin Ganryo Binran, edited by Japan Association of Pigment Technologies (Nihon Ganryo Gijutsu Kyokai, 1977), "Latest Pigment Application Technologies" (Saishin Ganryo Oyo Gijutsu, CMC, 1986), and "Printing Ink Technologies" (Insatsu Inki Gijutsu, CMC, 1984).

Examples of kinds of pigment include black pigments, yellow pigments, orange pigments, brown pigments, red pigments, purple pigments, blue pigments, green pigments, fluorescent pigments, metal powder pigments, and polymers containing chemically combined dyes. Specific examples of the pigments are insoluble azo pigments, azo lake pigments, condensed azo pigments, chelated azo pigments, phthalocyanine based pigments, anthraquinone based pigments, perylene and perinone based pigments, thioindigo based pigments, quinacridone based pigments, dioxazine based pigments, isoindolinone based pigments, quinophthalone based pigments, dyed lake pigments, azine pigments, nitroso pigments, nitro pigments, natural pigments, fluorescent pigments, inorganic pigments, carbon black, and the like.

These pigments may be used without being surface-treated or may be used after being surface-treated. Possible surface treatments include a treatment wherein a resin or a wax is coated on the surface of the pigment, a treatment wherein a surfactant is adhered to the surface of pigment particles, and a treatment wherein a reactive substance (e.g., a silane coupling agent, an epoxy compound, or a polyisocyanate) is bound to the surface of the pigment particles. These surface-treating methods are described in "Properties and Applications of Metal Soaps" (Sachi Shobo Co., Ltd.), "Printing Ink Technologies" (Insatsu Inki Gijutsu, CMC, 1984), and "Latest Pigment Application Technologies" (Saishin Ganryo Oyo Gijutsu, CMC, 1986).

The diameter of the pigment particles is preferably in the range of 0.01 to 10 $\mu$m, more preferably in the range of 0.05 to 1 $\mu$m, and most preferably in the range of 0.1 to 1 $\mu$m. If the diameter is less than 0.01 $\mu$m, stability of a dispersion in a coating liquid for forming the recording layer is insufficient, whereas if the diameter is greater than 10 $\mu$m, uniformity of the photosensitive layer is poor.

A known dispersing technology employed in the preparation of ink, toners, and the like can also be used for the purpose of dispersing the pigment. Examples of a dispersing machine include an ultrasonic dispersing machine, a sand mill, an attritor, a pearl mill, a super mill, a ball mill, an impeller, a disperser, a KD mill, a colloid mill, a dynatron, a three-roller mill, a pressurized kneader, and the like. Details of these dispersing technologies are described in "Latest Pigment Application Technologies" (Saishin Ganryo Oyo Gijutsu, CMC, 1986).

Dyes suitable for use in the present invention are commercially available dyes and the dyes described in "Handbook of Dyes", (edited by Association of Organic Synthetic Chemistry (Yuki Gosei Kagaku Kyokai), 1970). Specific examples of the dyes include azo dyes, azo dyes in the form of a metallic complex salt, pyrazolone azo dyes, anthraquinone dyes, phthalocyanine dyes, carbonium dyes, quinoneimine dyes, methine dyes, cyanine dyes, diimmonium dyes, and aminium dyes.

Of these pigments and dyes, pigments and dyes which absorb infrared or near-infrared rays are particularly preferable for use in the present invention because of suitability for use in combination with a laser emitting infrared or near-infrared rays.

A pigment which absorbs infrared or near-infrared rays and is suited for use in the present invention is carbon black. Examples of dyes which absorb infrared or near-infrared rays and are suited for use in the present invention include cyanine dyes described in, e.g., JP-A Nos. 58-125246, 59-84356, 59-202829, and 60-78787; methine dyes described in, e.g., JP-A Nos. 58-173696, 58-181690 and 58-194595; naphthoquinone dyes described in, e.g., JP-A Nos. 58-112793, 58-224793, 59-48187, 59-73996, 60-52940, and 60-63744; squarylium dyes described in, e.g., JP-A No. 58-112792; cyanine dyes described in U.K. Patent No. 434,875; and dihydropyrimidinesquarylium dyes described in U.S. Pat. No. 5,380,635.

Another compound suitable as a dye is a near-infrared ray absorbing sensitizer described in U.S. Pat. No. 5,156,938. Also particularly suitable are a substituted arylbenzo(thio)pyrylium salt described in U.S. Pat. No. 3,881,924; a trimethinethiopyrylium salt described in JP-A No. 57-142645 (U.S. Pat. No. 4,327,169); pyrylium-based compounds described in JP-A Nos. 58-181051, 58-220143, 59-41363, 59-84248, 59-84249, 59-146063, and 59-146061; a cyanine dye described in JP-A No. 59-216146; a pentamethinethiopyrylium salt described in U.S. Pat. No. 4,283,475; pyrylium compounds described in Japanese Patent Application Publication (JP-B) Nos. 5-13514 and 5-19702, EPOLIGHT III-178, EPOLIGHT III-130, EPOLIGHT III-125, and EPOLIGHT IV-62A (all manufactured by Epolin Corp.) as commercially available products; and the like.

Further examples of particularly preferred dyes are the near-infrared absorbing dyes described in U.S. Pat. No. 4,756,993 as formulae (I) and (II).

Since these pigments or dyes are used in combination with the specific infrared absorbers described previously, if a pigment or dye is added, the amount to be added of the pigment or dye is preferably 0.01 to 20% by weight based on the weight of the total solids of the image-forming material. If a dye is added, the amount of the dye is particularly preferably 0.5 to 10% by weight. If a pigment is added, the amount of the pigment is particularly preferably 0.1 to 5% by weight. If the amount to be added of the pigment or dye is less than 0.01% by weight, the effect of addition of the pigment or dye cannot be observed. On the other hand, if the amount to be added is more than 20% by weight, the effect of raising sensitivity by the specific infrared absorbers described previously may be adversely affected.

Components Other than Infrared Absorbers

As other components of the image-forming material of the present invention, components of various conventionally known image-forming materials recordable by radiation in the infrared region can be appropriately selected for use.

Of the image-forming materials whose solubility in an aqueous alkaline solution is changed by infrared exposure, and image-forming materials whose hydrophilicity and hydrophobicity are changed by infrared exposure, there are two types; namely a negative-type image-forming material whose developability is lowered by exposure to infrared radiation, and a positive-type image-forming material whose developability is raised by exposure to infrared radiation.

Examples of the negative-type image-forming material include a conventionally known negative-type polarity switchable material (i.e., conversion from hydrophilicity to hydrophobicity), a radical-polymerizable material, and an acid catalyst-crosslinkable material (including cationic polymerization). Of these types, the radical-polymerizable material and the acid catalyst-crosslinkable material are preferable in view of plate life. In these materials, the radical or acid to be generated by irradiation with light or heating becomes an initiator or catalyst which causes the compound constituting the image-forming material to polymerize or crosslink so that image portions are formed. In the materials, the sensitivity and other properties of the material can be improved by a combination thereof with the infrared absorber described previously.

Examples of the positive-type image-forming material include a conventionally known positive-type polarity switchable material (i.e., conversion from hydrophobicity to hydrophilicity), an acid catalyst-decomposable material, and an interaction-breakable material (heat-sensitive positive-type). Of these types, a positive-type, polarity switchable material based on thermal decomposition of a sulfonic ester, the acid catalyst-decomposable material, and the interaction-breakable material are preferable in view of image quality. In these materials, acid or thermal energy to be generated by irradiation with light or heat breaks a bond of a layer-constituting polymeric compound. As a result, the polymeric compound becomes soluble in water or in an aqueous alkaline solution such that the polymeric compound is removed by development processing and non-image portions are formed. In these materials, the sensitivity and other properties of the material can be improved by a combination thereof with the infrared absorber described previously.

First, of the image-forming materials of the present invention, details of the negative-type image-forming material are given below.

<Radical-polymerizable Image-forming Materials>

The radical-polymerizable image-forming material that can be used in the recording material of the planographic printing original plate of the present invention contains, besides the infrared absorbers, a compound that generates radicals by light or heat (this compound is hereinafter referred to as a radical generator) and a compound capable of undergoing radical polymerization (this compound is hereinafter referred to as a polymerizable compound). For example, infrared laser irradiation generates radicals from the radical generator at portions exposed to the radiation and the radicals act as initiators for the polymerizable compound, to cause radical polymerization and to cure so that image portions are produced. Addition of the specific infrared absorbers described previously to such radical-polymerizable image-forming materials makes it possible to raise sensitivity or to accelerate radical polymerization. A combination of the radical generator and the polymerizable compound may be appropriately selected from conventionally known combinations, as long as the strength of a film produced by the radical polymerization meets the requirements for the image recording layer. In addition, in order to enhance reactivity of the radical generator, an accelerator such as an onium salt, a reducing agent, or the like may be used together therewith. Also preferred as components usable in the radical-polymerizable image-forming material are, for example, components listed as constituent components of a thermally polymerizable recording layer described in JP-A No. 8-108621 and components listed as constituent components of a recording layer described in JP-A No. 9-34110.

(Radical Generators)

Known radical polymerization initiators that are in common use for polymer synthesis reactions by radical polymerization can be used without particular limitations as the radical generator for use in the radical-polymerizable image-forming material. Examples of the radical generator include azobisnitrile compounds such as 2,2'-azobisisobutyronitrile and 2,2'-azobispropionitrile; organic peroxides such as benzoyl peroxide, lauroyl peroxide, acetyl peroxide, t-butyl perbenzoate, α-cumyl hydroperoxide, di-t-butyl peroxide, diisopropylperoxy dicarbonate, t-butylperoxyisopropyl carbonate, peroxy acids, alkylperoxy carbamates, and nitrosoarylacylamines; inorganic peroxides such as potassium persulfate, ammonium persulfate, and potassium perchlorate; azo or diazo compounds such as diazo aminobenzene, p-nitrobenzene diazonium, azobis-substituted alkanes, diazo thioethers, and arylazo sulfones; nitrosophenylurea; tetraalkylthiuram disulfides such as tetramethylthiuram disulfides; diaryl disulfides such as dibenzoyl disulfide; dialkylxanthogenic acid disulfide; arylsulfinic acids; arylalkylsulfonic acids; 1-alkanesulfinic acids; and the like.

When the planographic printing original plate, which has a recording layer comprising the image-forming material containing the infrared absorber for use in the present invention, is recorded on with an infrared laser, sufficient sensitivity can be obtained even if a radical generator whose activation energy is large is used, because the temperature of the surface exposed to light reaches as high as 600° C. or above (though the temperature depends on the energy of the laser).

The activation energy for the radical generator to generate the radical is preferably 30 Kcal/mol or more. Examples of such kinds of radical generators include azobisnitrile compounds and organic peroxides. Of these, preferred are compounds which have excellent stability at room temperature, exhibit a high decomposition rate when heated, and become colorless when decomposed. These compounds are, for example, benzoyl peroxide, 2,2'-azobisisobutyronitrile, and the like.

The radical generators may be used singly or in a combination of two or more. The radical generator is used in an amount of 0.5–30% by weight, preferably 2–10% by weight, based on the total weight of solid components of the radical-polymerizable image-forming material.

In addition, a compound that generates a radical by the interaction with an onium salt, which is described later, can also be suitably used. Specific examples of the compound include halides (e.g., α-haloacetophenones, trichloromethyltriazines, and the like), azo compounds, aromatic carbonyl compounds (e.g., benzoin esters, ketals, acetophenones, o-acyloxyiminoketones, acylphosphine oxides, and the like), hexaarylbisimidazole compounds, peroxides, and so on. Preferred among these compounds are the bisimidazole compounds disclosed as (A-1)~(A-4) on page 16 of JP-A No. 9-34110.

This type of radical generator raises the sensitivity by interaction with an onium salt. Examples of the onium salt that can be used in combination with the radical generator include phosphonium salts, sulfonium salts, iodonium salts, and ammonium salts described in paragraphs [0022]~[0049] of the above-cited patent literature.

The amount to be added of the onium salt is 0.05–50% by weight based on the total weight of the solid components of the image-forming material, though the amount varies with the kinds and states of the onium salt in use.

Onium salts, such as iodonium salts, sulfonium salts, phosphonium salts, and diazonium salts, suitably usable as acid-generating agents listed in the acid-crosslinking agents described later, can be used singly as radical generators without being used in combination with the radical generators described above. An amount to be used of such onium salts is preferably 0.05–50% by weight based on the total weight of the solid components of the image-forming material, though the amount varies depending on the kind and state of the onium salt to be used.

(Polymerizable Compounds)

Conventionally known monomers having a polymerizable group may be used without particular limitation as the polymerizable polymeric compound that is polymerized and cured by the radical generated from the radical generator. Specific examples of such monomers include monofunctional acrylate esters, such as 2-ethylhexyl acrylate, 2-hydroxyethyl acrylate, 2-hydroxypropyl acrylate, derivatives thereof, and compounds in which the acrylate is replaced by methacrylate, itaconate, crotonate, maleate, or the like; difunctional acrylate esters, such as polyethylene glycol diacrylate, pentaerythritol diacrylate, bisphenol A diacrylate, diacrylate of ε-caprolactam addition product of neopentyl glycol hydroxypivalate, derivatives thereof, and compounds in which the acrylate is replaced by methacrylate or the like as described above; and polyfunctional acrylate esters, such as trimethylolpropane tri(meth)acrylate, dipentaerythritol pentaacrylate, dipentaerythritol hexaacrylate, pyrogallol triacrylate, derivatives thereof, and compounds in which the acrylate is replaced by methacrylate or the like. Also suitably used is a so-called prepolymer prepared by introducing acrylic acid or methacrylic acid into an oligomer having a proper molecular weight such that a photopolymerizable property is imparted.

Other examples include the compounds described in JP-A Nos. 58-212994, 61-6649, 62-46688, 62-48589, 62-173295, 62-187092, 63-67189, and 1-244891. In addition, compounds which are described in "11290 Chemical Products" (Kagaku Kogyo Nippou Co., Ltd.), pp.286–289 and compounds which are described in "UV·EB Curing Handbook (materials)" (Koubunshi Kankoukai), pp.11–65 can be suitably used.

Among these compounds, compounds which have in the molecule thereof two or more acryl or methacryl groups, are preferable in the present invention. Desirably, these compounds have a molecular weight of 10,000 or less and more preferably 5,000 or less. In accordance with purpose, a single polymerizable compound or a combination of two or more kinds of polymerizable compound may be selected from the monomers and prepolymers each having a polymerizable group, including those previously illustrated, provided that the combination is free from any compatibility or affinity problem, and can be used in the present invention.

A compound having an ethylenically unsaturated group, in an amount of preferably 20–80% by weight, more preferably 30–60% by weight, based on the total weight of the solid components of the image-forming material, is incorporated in the image-forming material.

(Binder Resins)

If necessary, a binder resin may be used in the radical-polymerizable image-forming material. Examples of the binder resin include polyester resins, polyvinyl acetal resins, polyurethane resins, polyaniide resins, cellulosic resins, olefinic resins, polyvinyl chloride resins, (meth)acrylic resins, styrenic resins, polycarbonate, polyvinyl alcohol, polyvinylpyrrolidone, polysulfone, polycaprolactone resins, polyacrylonitrile resins, urea resins, epoxy resins, phenoxy resins, rubber-based resins, and the like. In addition, a resin which has in the molecule thereof an unsaturated bond, for example, a diallyl phthalate resin or a derivative thereof or chlorinated polypropylene, can be polymerized with the above-described compound having an ethylenically unsaturated group and therefore can be suitably used, depending on applications. Resins selected from the above-listed resins may be used singly or in a combination as a binder resin.

The amount to be used of the binder resin is preferably 500 parts by weight or less, more preferably 200 parts by weight or less, based on 100 parts by weight of the polymerizable compound.

(Other Compounds)

The radical-polymerizable image-forming material may contain conventionally known additives which are used together with conventionally known photopolymerizable compounds, as long as the effects of the present invention are not impaired.

An example of the additives is a thermal polymerization inhibitor. Specific examples of the thermal polymerization inhibitor include quinone and phenolic compounds such as hydroquinone, pyrogallol, p-methoxyphenol, catechol, β-naphthol, 2,6-di-t-butyl-p-cresol, and the like. These additives are used in an amount of less than 10 parts by weight, preferably about 0.01–5 parts by weight, per 100 parts by weight of the total of the polymerizable compound having an ethylenically unsaturated bond and the binder resin.

Compounds that may be added as an oxygen quencher are N,N-dialkylaniline derivatives such as the compounds described in column 11, line 58 through column 12, line 35, of U.S. Pat. No. 4,772,541.

In addition, a plasticizer may be used in order to improve film properties. Examples of the plasticizer include phthalic acid esters, trimellitic acid esters, adipic acid esters, saturated or unsaturated carboxylic acid esters, citric acid esters, epoxidized soybean oil, epoxidized linseed oil, stearic acid epoxides, orthophosphoric acid esters, phosphorous acid esters, glycol esters, and so on.

An acid-generating agent is also preferably used in combination as an additive which, when heated, generates an acid and thus accelerates the decomposition of the radical generator. Acid-generating agents, described in detail in the following explanation of the acid-crosslinkable image-forming material, can be used.

The above-described components, which are appropriately selected, are dissolved in a suitable solvent and the resulting solution is coated on a substrate so as to form a recording layer. The coating weight after drying is preferably 0.01 to 5.0 g/m$^2$.

<Acid-Crosslinkable Image-Forming Material>

The acid-crosslinkable image-forming material of the present invention contains, besides the infrared absorber, a compound which generates an acid by the action of light or heat (this compound is hereinafter referred to as an acid-generating agent), a compound which can crosslink by catalytic action of the generated acid (this compound is hereinafter referred to as a crosslinking agent), and a binder polymer which can react with the crosslinking agent in the presence of the acid to form a layer containing these compounds. In the acid-crosslinkable image-forming material, light irradiation or heating decomposes the acid-generating agent and causes the agent to generate an acid which accelerates the activity of the crosslinking agent. Consequently, a strong crosslinked structure is formed between the crosslinking agents themselves or between the crosslinking agent and the binder polymer, which structure lowers the alkali solubility of the material such that the material becomes insoluble in a developing solution. The sensitivity of the material can be raised by the addition of the infrared absorber.

Examples of components of the acid-crosslinkable image-forming material having the above-described characteristics include components of conventionally known image-forming materials such as an image-forming material composed of a radiation-sensitive composition described in JP-A No. 7-20629, which contains a resol resin, a novolak resin, a latent Broensted acid, and an infrared absorber. The term "a latent Broensted acid" as used herein means a precursor which, when decomposed, produces a Broensted acid and which is a compound having the characteristics of both the acid-generating agent and the acid-crosslinking agent in the present invention. The Broensted acid is believed to catalyze a matrix-forming reaction between the resol resin and the novolak resin. Examples of Broensted acids suitable to this purpose are trifluoromethanesulfonic acid and hexafluorophosphonic acid.

In addition, an ionic latent Broensted acid is preferred. Examples of such acids include onium salts, particularly iodonium salts, sulfonium salts, phosphonium salts, selenonium salts, diazonium salts, and arsonium salts. A nonionic latent Broensted acid can also be suitably used. Examples of such acids include the following compounds: $RCH_2X$, $RCHX_2$, $RCX_3$, $R(CH_2X)_2$, and $R(CH_2X)_3$ (where X is Cl, Br, F, $CF_3$, or $SO_3$; and R is an aromatic group, an aliphatic group, or a group consisting of a combination of an aromatic group and an aliphatic group).

In addition, an image-forming material described in JP-A No. 11-95415, which contains an acid-crosslinkable compound and a high-molecular-weight binder, is also suitable as a component of the acid-crosslinkable image-forming material. This material is an image-forming material containing a compound, which, when irradiated with active radiation, can generate an acid (for example, a salt, such as a diazonium, a phosphonium, a sulfonium, an iodonium or the like, an organohalogen compound, an ortho-quinonediazide sulfonylchloride, or an organometal/organohalogen compound) together with a compound which has at least one bond capable of crosslinking in the presence of the above-mentioned acid (for example, an amino compound having as a functional group at least two of such groups as an alkoxymethyl group, a methylol group, an acetoxymethyl group, and the like; an aromatic compound which is at least di-substituted and has as a functional group an alkoxymethyl group, a methylol group, an acetoxymethyl group, or the like; resol resin; a furan resin; an acrylic resin synthesized from a specific monomer; or the like). This material can be used as a component of the image-forming material of the present invention.

Next, the acid-generating agent, crosslinking agent, binder polymer, and others, which are components other than the infrared absorber of the acid-crosslinkable image-forming material of the present invention, are explained, respectively.

(Acid-Generating Agents)

In the present invention, a compound that generates an acid by light or heat (i.e., an acid-generating agent) denotes a compound which is decomposed by infrared irradiation or by heating to 100° C. or a higher temperature and generates an acid. The acid to be generated is preferably a strong acid having a pKa of 2 or less, such as sulfonic acid or hydrochloric acid.

Onium salts such as iodonium salts, sulfonium salts, phosphonium salts, and diazonium salts are some examples of acid-generating agents preferably used in the present invention. Specifically, the compounds described in U.S. Pat. No. 4,708,925 and JP-A No. 7-20629 may be used. Particularly, iodonium salts, sulfonium salts, and diazonium salts—all of which contain a sulfonate ion as a counter ion—are preferred. As to the diazonium salts, a diazonium compound described in U.S. Pat. No. 3,867,147, a diazonium compound described in U.S. Pat. No. 2,632,703, and diazo resins described in JP-A Nos. 1-102456 and 1-102457 are also preferable. Examples of other preferable acid-generating agents include benzyl sulfonates described in U.S. Pat. Nos. 5,135,838 and 5,200,544; active sulfonic esters and disulfonyl compounds described in JP-A Nos. 2-100054, 2-100055 and 9-197671; and haloalkyl-substituted s-triazines described in JP-A No. 7-271029.

These acid-generating agents, in an amount of 0.01–50% by weight, preferably 0.1–40% by weight, and more preferably 0.5–30% by weight based on the total weight of the solid components of the image-forming material, are added to the image-forming material. If the amount of the acid-generating agent is less than 0.01% by weight, images cannot be obtained, and if the amount is more than 50% by weight, stains are undesirably generated in non-image portions during printing.

These compounds may be used singly or in a combination of two or more. Moreover, because the above-listed acid-generating agents can also be decomposed by ultraviolet irradiation, image recording can be carried out not only by infrared irradiation but also by ultraviolet irradiation if an image-forming material of the above-described mode is used.

(Acid-Crosslinking Agents)

The crosslinking agent that can be used in the acid-crosslinkable image-forming material of the present invention is not particularly limited in so far as the crosslinking agent is a compound which crosslinks by an acid. Preferred examples of the crosslinking agent include phenol derivatives represented by the following general formula (CA-I) (these derivatives are hereinafter occasionally referred to as low-molecular-weight phenol derivatives), polynuclear phenolic crosslinking agents represented by the following general formula (CA-II) and having in the molecules thereof three or more phenol rings each having two or three hydroxymethyl groups on the ring, mixtures of the low-molecular-weight phenol derivative and the polynuclear phenolic crosslinking agent and/or a resol resin.

General formula (CA-I)

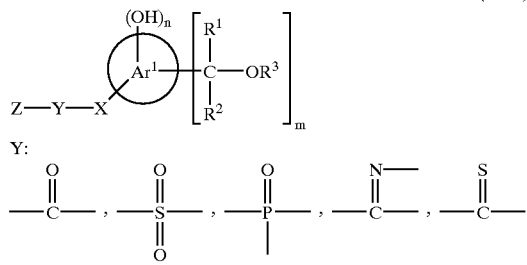

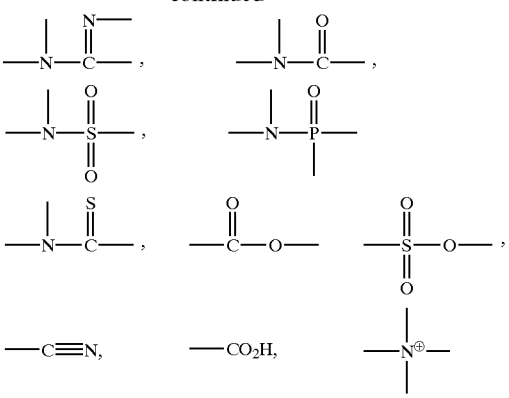

In the formula, $Ar^1$ represents an aromatic hydrocarbon ring which may have a substituent. $R^1$ and $R^2$ may be the same or different, and respectively represent a hydrogen atom or a hydrocarbon group having 12 or less carbon atoms. $R^3$ represents a hydrogen atom or a hydrocarbon group having 12 or less carbon atoms. m represents an integer from 2 to 4. a represents an integer from 1 to 3. X represents a bivalent linking group; Y represents a monovalent functional group or bi- to quadrivalent linking group having the above-illustrated partial structure, or a functional group having the above-illustrated partial structure capped with a one or more hydrogen atoms; Z is absent if Y is a terminal group, and represents a mono- to quadrivalent functional group which is present in accordance with the valency of the linking group Y.

General formula (CA-II)

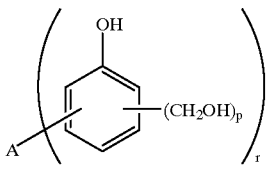

In the formula, A represents a hydrocarbon linking group having 1 to 20 carbon atoms and a valency of r; and r represents an integer from 3 to 20. p represents an integer from 2 to 3.

The details of the phenol derivative represented by the general formula (CA-I) are described in paragraphs [0098]–[0155] of the specification of Japanese Patent Application No. 11-352210 filed by the present applicant. The details of the polynuclear phenolic crosslinking agents, represented by the general formula (CA-II) and having in the molecules thereof three or more phenol rings each having two or three hydroxymethyl groups on the ring, are also described in paragraphs [0156]–[0165] of the specification of Japanese Patent Application No. 11-352210 filed by the present applicant.

These crosslinking agents may be used singly or in a combination of two or more.

In the present invention, the crosslinking agent is added in an amount of 5–70% by weight, preferably 10–65% by weight, based on the total weight of the solid components of the acid-crosslinkable image-forming material. If the amount of the crosslinking agent is less than 5% by weight, film strength of image portions becomes inferior when images are recorded, and if the amount is more than 70% by weight, storage stability is adversely affected.

(Binder Polymers)

Examples of the binder polymer that can be used in the acid-crosslinkable image-forming material of the present invention include a polymer having in a side chain or main chain thereof an aromatic hydrocarbon ring to which a hydroxyl group or an alkoxy group is directly linked. From the standpoint of sensitivity, the alkoxy group preferably has 20 or less carbon atoms. From the standpoint of availability of raw materials, the aromatic hydrocarbon ring is preferably a benzene ring, a naphthalene ring, or an anthracene ring. Although these aromatic hydrocarbon rings may have substituents, such as a halogen group, a cyano group or the like, other than the hydroxyl group or alkoxy group, these aromatic hydrocarbon rings preferably have no substituents of the hydroxyl group or alkoxy group in view of sensitivity.

A binder polymer that can be suitably used in the present invention is a polymer having a structural unit represented by the following general formula (Su-I), or a phenolic resin that is a novolak resin or the like:

General formula (Su-I)

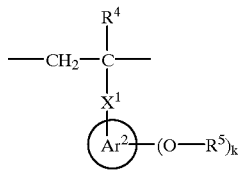

In the formula, $Ar^2$ represents a benzene ring, a naphthalene ring, or an anthracene ring; $R^4$ represents a hydrogen atom or a methyl group; $R^5$ represents a hydrogen atom or an alkoxy group having 20 or less carbon atoms; $X^1$ represents either a single bond or a bivalent linking group which contains at least one atom selected from C, H, N, O, and S and which has 0 to 20 carbon atoms; and k is an integer from 1 to 4.

The binder polymer for use in the present invention may be a homopolymer composed solely of the structural unit represented by general formula (Su-I) or may be a copolymer composed of this specific structural unit and a structural unit derived from another conventionally known monomer.

A proportion of the structural unit that is represented by the general formula (Su-I) and contained in this copolymer is preferably 50–100% by weight and more preferably 60–100% by weight.

The weight average molecular weight of the polymer to be used in the present invention is preferably 5,000 or more, and more preferably 10,000 to 300,000, while the number average molecular weight is preferably 1,000 or more and more preferably 2,000 to 250,000. The polydispersity index (weight average molecular weight/number average molecular weight) is 1 or more and more preferably falls within the range of 1.1 to 10.

Although the polymer may be a random polymer, a block polymer, a graft polymer, or the like, the polymer is preferably a random polymer.

Next, novolaks are described. Examples of novolak resin that can be suitably used in the present invention include phenol novolaks, o-, m-, or p-cresol novolaks, copolymers thereof, and novolaks utilizing phenols substituted by a halogen atom, an alkyl group or the like.

The weight average molecular weight of the novolak resin is preferably 1,000 or more, and more preferably 2,000 to 20,000, while the number average molecular weight is preferably 1,000 or more and more preferably 2,000 to 15,000. The polydispersity index is 1 or more and more preferably falls within the range of 1.1 to 10.

It is also a preferred mode to use, as the binder polymer, a polymer which has a heterocyclic group having an unsaturated bond in the ring.

The term "heterocyclic group" as used herein means a group which includes one or more heteroatoms other than carbon atoms among the atoms constituting the ring. Nitrogen, oxygen, sulfur, and silicon atoms are preferred as the heteroatoms to be used. The use of a polymer having such a heterocyclic group is believed to enhance chemical structural reactivity due to functioning of lone pairs present in the heterocyclic ring, such that a film having superior plate life is obtainable.

The binder polymers described above for use in the present invention may be used singly or in a combination of two or more. These polymers are added in an amount of 20–95% by weight, preferably 40–90% by weight, based on the total weight of the solid components of the acid-crosslinkable image-forming material. If the amount to be added is less than 20% by weight, film strength of image portions becomes inferior when images are formed, and if the amount to be added is more than 95% by weight, images are not formed.

Next, of the image-forming materials of the present invention, the interaction-breakable image-forming material (heat-sensitive positive), the acid-decomposable image-forming material, and the polarity switchable image-forming material, which are each a positive-type, image-forming material, are explained, respectively.

<Interaction-Breakable Image-Forming Material (Heat-Sensitive Positive)>

The interaction-breakable image-forming material comprises, besides the infrared absorber, a polymer insoluble in water but soluble in an aqueous alkaline solution.

In a case where the infrared absorber has in the molecule a group, such as an ammonium or iminium group, capable of interacting with the polymeric compound soluble in an aqueous alkaline solution, the infrared absorber has, besides a light-to-heat converting function of being infrared absorber, a function of being compatibilized with the polymeric compound soluble in an aqueous alkaline solution such that the solubility of the polymeric compound in the aqueous alkaline solution is reduced and a function of diminishing the above-described effect of reducing the solubility when heated. Accordingly, it is also possible to form an image-forming material even without the incorporation of a compound that reduces the solubility of the polymeric compound in the aqueous alkaline solution.

Examples of the polymeric compound soluble in an aqueous alkaline solution include homopolymers having in the main chain and/or side chain thereof an acidic group; copolymers thereof; and mixtures thereof.

Among these polymers, a polymer which has in the polymer main chain and/or side chain thereof any acidic group selected from the following acidic groups (1)–(6) is preferable from the standpoint of solubility and inhibition of dissolution in the aqueous alkaline solution.

(1) A hydroxyphenyl group (—Ar—OH)
(2) A sulfonamide group (—SO$_2$NH—R)
(3) A substituted sulfonamide based acidic group (hereinafter referred to as "active imido group") (—SO$_2$NHCOR, —SO$_2$NHSO$_2$R, and —CONHSO$_2$R)
(4) A carboxyl group (—CO$_2$H)
(5) A sulfonic acid group (—SO$_3$H)
(6) A phosphoric acid group (—OPO$_3$H$_2$)

In (1)–(6) listed above, Ar represents a bivalent aryl linking group which may have a substituent, and R represents a hydrocarbon group which may have a substituent.

Of polymers soluble in an aqueous alkaline solution which have acidic groups selected from (1)~(6) listed above, polymers soluble in an aqueous alkaline solution which have (1) a phenolic hydroxyl group, (2) a sulfonamide group, or (3) an active imido group are preferable; and polymers soluble in an aqueous alkaline solution which have (1) a phenolic hydroxyl group or (2) sulfonamide group are particularly preferable from the standpoints of sufficiently securing solubility in an alkaline developing solution, development latitude, and film strength.

Examples of the polymers soluble in an aqueous alkaline solution that have acidic groups selected from (1)~(6) include the following.

Examples of (1) the polymer having a phenolic hydroxyl group and soluble in an aqueous alkaline solution include novolak resins, such as a condensation polymerization product from phenol and formaldehyde, a condensation polymerization product from m-cresol and formaldehyde, a condensation polymerization product from p-cresol and formaldehyde, a condensation polymerization product from a m-cresol/p-cresol mixture and formaldehyde, and a condensation polymerization product from phenol, cresol (which may be m-cresol, p-cresol, or a mixture of m-cresol and p-cresol) and formaldehyde; and a condensation polymerization product from pyrogallol and acetone; and examples further include copolymers produced by the copolymerization of compounds having a phenolic hydroxyl group in the side chain.

Examples of compounds having a phenolic hydroxyl group suited for use in the present invention include phenolic hydroxyl group-containing acrylamides, methacrylamides, acrylates, methacrylates, hydroxystyrenes, and the like.

From the standpoint of image-forming performance, it is preferable that the polymer soluble in an aqueous alkaline solution has a weight average molecular weight of $5.0 \times 10^2$ to $2.0 \times 10^4$ and a number average molecular weight of $2.0 \times 10^2$ to $1.0 \times 10^4$. These polymers may be used singly or in a combination of two or more. When these polymers are used in a combination, a condensation polymerization product from a phenol bearing as a substituent an alkyl group having 3 to 8 carbon atoms and formaldehyde, such as a condensation polymerization product from t-butylphenol and formaldehyde or a condensation polymerization product from octylphenol and formaldehyde; or alternatively, a polymer soluble in an aqueous alkaline solution, which has a phenolic structure comprising an aromatic ring bearing an electron-withdrawing group and which is described in JP-A No. 2000-241972 previously filed by the present inventors, or the like may be used together.

Examples of (2) the polymer having a sulfonamide group and soluble in an aqueous alkaline solution include polymers comprising as main constituting components the smallest constituting units derived from, for example, a compound having a sulfonamide group. Examples of such compounds include compounds which have in the molecules thereof at least one sulfonamide group having at least one hydrogen atom linked to a nitrogen atom together with at least one unsaturated bond capable of polymerizing. Of these compounds, compounds which have low molecular weight and which have an acryloyl group, allyl group, or vinyloxy group together with a substituted or mono-substituted aminosulfonyl group or a substituted sulfonylimino group are preferable. Examples of these compounds include the compounds represented by the following general formula (S-1) ~(S-5).

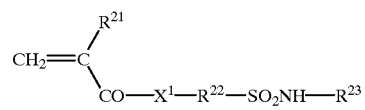

General formula S-1

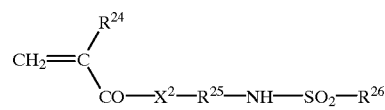

General formula S-2

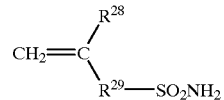

General formula S-3

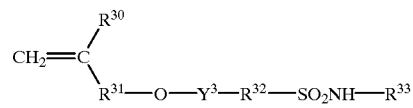

General formula S-4

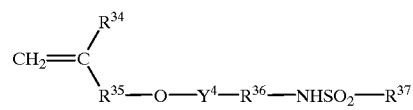

General formula S-5

In the formulae, $X^1$ and $X^2$ each independently represents —O— or —NR$^{27}$—. $R^{21}$ and $R^{24}$ each independently represents a hydrogen atom or —CH$_3$. $R^{22}$, $R^{25}$, $R^{29}$, $R^{32}$ and $R^{36}$ each independently represents an alkylene group, a cycloalkylene group, an arylene group, or an aralkylene group, each of which groups has 1 to 12 carbon atoms and may have a substituent. $R^{23}$, $R^{27}$, and $R^{33}$ each independently represents a hydrogen atom, an alkyl group, a cycloalkyl group, an aryl group, or an aralkyl group, each of which groups has 1 to 12 carbon atoms and may have a substituent. $R^{26}$ and $R^{37}$ each independently represents an alkyl group, a cycloalkyl group, an aryl group, or an aralkyl group, each of which groups has 1 to 12 carbon atoms and may have a substituent. $R^{28}$, $R^{30}$ and $R^{34}$ each independently represents a hydrogen atom or —CH$_3$. $R^{31}$ and $R^{35}$ each independently represents a single bond or alternatively an alkylene group, a cycloalkylene group, an arylene group, or an aralkylene group, each of which groups has 1 to 12 carbon atoms and may have a substituent. $Y^3$ and $Y^4$ each independently represents a single bond or —CO—.

Among the compounds represented by the formulae (S-1) (S-5), m-aminosulfonylphenyl methacrylate, N-(p aminosulfonylphenyl)methacrylamide, N-(p-aminosulfonylphenyl)acrylamide, and the like can be particularly suitably used as materials for the positive-type planographic plate of the present invention.

Examples of (3) the polymer having an active imido group and soluble in an aqueous alkaline solution include polymers comprising as main constituting components the smallest constituting units derived from, for example, a compound having an active imido group. Examples of such compound include a compound which has in the molecule thereof at least one active imido group represented by the formula given below together with at least one unsaturated bond capable of polymerizing.

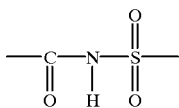

More specifically, N-(p-toluenesulfonyl)methacrylamide, N-(p-toluenesulfonyl)acrylamide, and the like can be suitably used.

Examples of (4) the polymer having a carboxyl group and soluble in an aqueous alkaline solution include polymers comprising as main constituting components the smallest constituting units derived from, for example, a compound having in the molecule thereof at least one carboxyl group and at least one unsaturated bond capable of polymerizing.

Examples of (5) the polymer having a sulfonic acid group and soluble in an aqueous alkaline solution include polymers comprising as main constituting components the smallest constituting units derived from, for example, a compound having in the molecule thereof at least one sulfonic acid group and at least one unsaturated bond capable of polymerizing.

Examples of (6) the polymer having a phosphoric acid group and soluble in an aqueous alkaline solution include polymers comprising as main constituting components the smallest constituting units derived from, for example, a compound having in the molecule thereof at least one phosphoric acid group and at least one unsaturated bond capable of polymerizing.

The smallest constituting units, which have the acidic groups selected from (1)–(6) listed above and make up the polymers soluble in an aqueous alkaline solution, do not necessarily need to be of the same kind. Therefore, a polymer which is made by copolymerizing two or more kinds of the smallest constituting units each having the same acidic group, or a polymer which is made by copolymerizing two or more kinds of the smallest constituting units each having different acidic groups, can also be used.

The copolymer described above contains preferably 10 mol % or more, and more preferably 20 mol % or more, of a compound which is to be copolymerized and has an acidic group selected from (1)–(6) listed above in the copolymer. If the content is less than 10 mol %, the development latitude may not be sufficiently improved.

<Acid-Decomposable Image-Forming Material>

The acid-decomposable image-forming material comprises, besides the infrared absorber, a compound which generates an acid by the action of light or heat (i.e., an acid-generating agent), and a compound whose chemical bond is severed by the generated acid acting as a catalyst and thereby increases solubility in alkaline developing solution (an acid-decomposable compound).

The acid-decomposable image-forming material may further contain a polymeric compound as a binder component. Alternatively, the acid-decomposable compound itself may be a polymeric compound or a precursor thereof functioning as the binder component. The acid-generating agent and the binder component may be those described in the explanation of the acid-crosslinkable image-forming material.

(Acid-Decomposable Compound)

In the present invention, the compound whose chemical bond is severed by an acid acting as a catalyst and thereby increases solubility in the alkaline developing solution, is, in other words, a compound having in the molecule thereof a bond decomposable by an acid. Such a compound may be the compound described as "(b) a compound having at least one acid-decomposable bond" in JP-A No. 9-171254. Preferred examples of the acid-decomposable bond include a —(CH$_2$CH$_2$O)$_n$— group (where n is an integer from 2 to 5).

Among these compounds, use of a compound represented by the following general formula (AD-I) is preferable from the standpoint of sensitivity and developability.

General formula (AD-I)

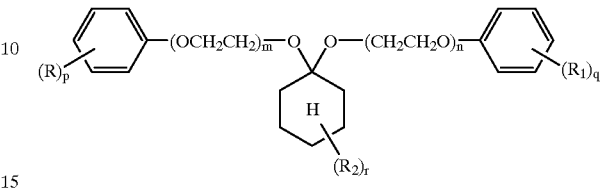

In the formula, R, R$^1$, and R$^2$ each represents a hydrogen atom, an alkyl group having 1 to 5 carbon atoms, an alkoxy group having 1 to 5 carbon atoms, a sulfo group, a carboxyl group, or a hydroxyl group; p, q, and r each represents an integer from 1 to 3; and m and n each represents an integer from 1 to 5.

In the general formula (AD-I), the alkyl group represented by R, R$^1$, or R$^2$ may be a straight-chain or branched alkyl group. Examples of the alkyl group include a methyl group, an ethyl group, a propyl group, an isopropyl group, a butyl group, a tert-butyl group, a pentyl group, and the like. Examples of the alkoxy group include a methoxy group, an ethoxy group, a propoxy group, an isopropoxy group, a butoxy group, a tert-butoxy group, a pentoxy group, and the like. The sulfo group and the carboxyl group include salts thereof. Among the compounds represented by the general formula (AD-I), particularly preferred compounds are those in which m and n are 1 or 2. The compounds represented by the general formula (AD-I) can be synthesized by conventionally known methods.

Examples of the acid-decomposable compound that can be used in the present invention include compounds having a C—O—C bond described in JP-A Nos. 48-89603, 51-120714, 53-133429, 55-12995, 55-126236, and 56-17345; compounds having an Si-O-C bond described in JP-A Nos. 60-37549 and 60-121446; and other acid-decomposable compounds described in JP-A Nos. 60-3625 and 60-10247. Further examples thereof include compounds having an Si-N bond described in JP-A No. 62-222246; carbonic esters described in JP-A No. 62-251743; orthocarbonic esters described in JP-A No. 62-209451; orthotitanic esters described in JP-A No. 62-280841; orthosilicic esters described in JP-A No. 62-280842; acetals, ketals, and orthocarbonic esters described in JP-A Nos. 63-010153, 9-171254, 10-55067, 10-111564, 10-87733, 10-153853, 10-228102, 10-268507, 10-282648, 10-282670, and EP-0884647A1; and compounds having a C-S bond described in JP-A No. 62-244038.

Among the acid-decomposable compounds listed above, particularly preferable are the compounds having a C—O—C bond, compounds having an Si—O—C bond, orthocarbonic esters, acetals, ketals, and silyl ethers described in JP-A Nos. 53-133429, 56-17345, 60-121446, 60-37549, 62-209451, 63-010153, 9-171254, 10-55067, 10-111564, 10-87733, 10-153853, 10-228102, 10-268507, 10-282648, 10-282670, and EP-0884647A1.

Among these acid-decomposable compounds, preferably used are polymeric compounds which have in the main chain thereof repeating acetal or ketal portions and whose solubility in an alkaline developing solution is raised by the generated acid.

These acid-decomposable compounds may be used singly or in a combination of two or more. These compounds are added in an amount of 5–70% by weight, preferably 10–50% by weight, and more preferably 15–35% by weight based on the total weight of the solid components of the image-forming material. If the amount to be added is less than 5% by weight, smudges on non-image portions tend to occur easily, whereas if the amount to be added is more than 70% by weight, film strength in image portions become insufficient.

<Polarity Switchable Image-Forming Material>

The polarity switchable image-forming material comprises, besides the infrared absorber, a polarity switchable substance which is converted from a lipophilic substance to a hydrophilic substance by heat.

The polarity switchable substance which is converted from a lipophilic substance to a hydrophilic substance by heat means a substance which exhibits a change of state from a state having no affinity, such as swelling or dissolution, with water at room temperature to a state having affinity with water at room temperature. This change may or may not be accompanied by a chemical reaction. A change accompanied by a chemical reaction is preferable because the degree of polarity conversion is larger. Examples of a polarity conversion reaction include formation of a hydrophilic group by heat. Examples of a hydrophilic substituent include an acidic group such as phosphoflic acid, sulfonic acid, carboxylic acid, sulfonamide, and phenol; a hydroxyl group: an amino group; and an onium salt such as an ammonium salt. A reaction which produces such a substituent by heat is preferable. Examples of the polarity switchable substance include carboxylate esters described in JP-A No. 7-186562, photocbroflhic compounds described in JP-A Ms. 9-240148, 4-44895, 8-3463, and 8-156401, the inorganic compounds described in JP-A No. 51-115101, and the compounds capable of generating sulfonic acid described in JP-A No. 10-282672. Further, protective groups which generate the above-described hydrophilic groups by heat are suitably used. Examples of such protective groups include those described in Protective Groups in Organic Synthesis (Greene Theodra W. and Wuts Peter O. M., published by Wiley-Interscience Publication) and Protecting Groups (Philip I. Kocienski, published by George Thieme Verlag Stuttgart). These compounds may be polymers or compounds having low molecular weights.

Preferably, reaction temperature is not lower than 80° C. and not higher than 300° C. Particularly preferably, the reaction temperature is 120 to 200° C. If the reaction temperature is low, storability becomes inferior, and if the reaction temperature is high, sensitivity is reduced.

Other Components

According to requirements, a variety of additives may be added to the image-forming material of the present invention. For example, it is preferable to add a substance such as an onium salt, an aromatic sulfone compound, an aromatic sulfonic ester compound, a polyfunctional amine or the like to an interaction-breakable image-forming material, because addition thereof makes it possible to more effectively inhibit the polymer soluble in an aqueous alkaline solution from being dissolved in a developing solution, Examples of the onium salt include diazonium salts, ammonium salts, phosphonium salts, iodonium salts, sulfonium salts, selenonium salts, and arsonium salts. The onium salts are added preferably in an amount of 1–50% by weight, more preferably 5–30% by weight, and particularly preferably 10–30% by weight based on the total weight of the solid components of the image-forming material.

In addition to these additives, a cyclic acid anhydride, a phenol, and an organic acid can also be used in order to raise the sensitivity to a higher level. Examples of the cyclic acid anhydride include phthalic anhydride, tetrahydrophthalic anhydride, hexahydrophthalic anhydride, 3,6-endoxy-Δ4-tetrahydrophthalic anhydride, tetrachlorophthalic anhydride, maleic anhydride, chloromaleic anhydride, α-phenylmaleic anhydride, succinic anhydride, and pyromellitic anhydride, as described in U.S. Pat. No. 4,115,128. Examples of the phenol include bisphenol A, p-nitrophenol, p-ethoxyphenol, 2,4,4'-trihydroxybenzophenone, 2,3,4-trihydroxybenzophenone, 4-hydroxybenzophenone, 4,4',4''-trihydroxytriphenylmethane, and 4,4',3'',4''-tetrahydroxy-3,5,3',5'-tetramethyltriphenylmethane. Examples of the organic acid include sulfonic acids, sulfinic acids, alkylsulfuric acids, phosphonic acids, phosphoric esters, and carboxylic acids, as described in, e.g., JP-A Nos. 60-88942 and 2-96755.

The proportion of the cyclic acid anhydride, phenol, or organic acid in the image-forming material is preferably 0.05 to 20% by weight, more preferably 0.1 to 15% by weight, and particularly preferably 0.1 to 10% by weight.

Besides the compounds described above, compounds, such as epoxy compounds, vinyl ethers, hydroxymethyl-bearing phenol compounds and alkoxymethyl-bearing phenol compounds described in JP-A No. 8-276558, and crosslinkable compounds having an alkali-solubility inhibiting effect which are proposed by the present inventors and described in JP-A No. 9-32837, may be added appropriately, according to purposes.

Further, in order to broaden a stable range of conditions of development, the image-forming material in the present invention may contain a nonionic surfactant as described in JP-A Nos. 62-251740 and 3-208514 and an amphoteric surfactant as described in JP-A Nos. 59-121044 and 4-13149.

The image-forming material in the present invention may contain a dye or a pigment as a printout agent which makes it possible to produce a visible image immediately after exposure-induced heating and also as an image coloring agent.

A typical example of the printout agent is a combination of a compound which releases an acid by the exposure-induced heating (a photoacid-releasing agent) and an organic dye capable of forming a salt with the compound. Specific examples of the printout agent include a combination of o-naphthoquinonediazide-4-sulfonyl halogenide and an organic dye which forms a salt therewith, as described in JP-A Nos. 50-36209 and 53-8128, and a combination of a trihalomethyl compound and an organic dye which forms a salt therewith, as described in JP-A Nos. 53-36223, 54-74728, 60-3626, 61-143748, 61-151644, and 63-58440. Examples of the trihalomethyl compound are an oxazole-based compound and a triazine-based compound, both of which provide good storability while standing and a clear printout image.

A dye other than above-mentioned salt-forming organic dyes can also be used as an image-coloring agent. Suitable dyes include oil-soluble dyes and basic dyes, in addition to the salt-forming organic dyes. Specific examples of these dyes include Oil Yellow No. 101, Oil Yellow No. 103, Oil Pink No. 312, Oil Green BG, Oil Blue BOS, Oil Blue No. 603, Oil Black BY, Oil Black BS, and Oil Black T-505 (all manufactured by Orient Chemical Industries, Co., Ltd.), Victoria Pure Blue, Crystal Violet(C. I. 42555), Methyl Violet(C. 1. 42535), Ethyl Violet(C. I. 42600), Rhodamine B(C. I. 145170B), Malachite Green(C. I. 42000), and Methylene Blue(C. 1. 52015). The dyes described in JP-A No. 62-293247 are particularly preferable. The amount to be added of the dye may be 0.01 to 10% by weight, preferably 0.1 to 3% by weight, based on the weight of the total solids of the image-forming material.

If necessary, in order to impart flexibility to the layer, a plasticizer is incorporated into the image-forming material of the present invention. Examples of the plasticizer include butyl phthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and an oligomer or a polymer of acrylic acid or methacrylic acid.

B. Planographic Printing Original Plates

The planographic printing original plate of the present invention includes the recording layer containing the image-forming material described above. The planographic printing original plate of the present invention can be prepared by coating a suitable substrate with a coating liquid for forming the recording layer, which coating liquid is prepared by dissolving the above-described image-forming material in a solvent according to requirements.

Some illustrative nonlimiting examples of the solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, and water. These solvents may be used singly or in a combination of two or more.

The concentration of the total components (total solids including additives) in the solvent is preferably 1 to 50% by weight. The coated amount (solids) after coating and drying on the substrate varies according to application, but a desirable amount is generally 0.5 g to 5.0 g/m$^2$ for a photosensitive printing plate.

The coating liquid can be applied by various methods. Example methods include bar coating, rotational coating, spraying, curtain coating, dipping, air-knife coating, blade coating, and roll coating. As the coating amount decreases, film characteristics of the recording layer become poor, although apparent sensitivity increases.

In order to improve coatability, the coating liquid for forming the recording layer of the present invention may contain a surfactant. An example of this surfactant is a fluorine-based surfactant described in JP-A No. 62-170950. A preferred amount of the surfactant to be added is 0.01 to 1% by weight, more preferably 0.05 to 0.5% by weight, based on weight of total solids of materials for the printing plate.

A substrate to be used for preparation of the planographic printing original plate of the present invention is a dimensionally stable plate. Specific examples of the substrate include paper, paper laminated with a plastic (e.g., polyethylene, polypropylene, polystyrene, or the like), metal plates (such as aluminum, zinc, and copper), plastic films (such as diacetylcellulose, triacetylcellulose, cellulose propionate, cellulose butyrate, cellulose butyrate acetate, cellulose nitrate, polyethylene terephthalate, polyethylene, polystyrene, polypropylene, polycarbonate, and polyvinyl acetal), and paper or plastic films laminated or vapor-deposited with the above-mentioned metals.

A polyester film or an aluminum plate is preferable as a substrate for use in the planographic printing original plate of the present invention. Of these materials, an aluminum plate is particularly preferable, because the same has good dimensional stability and is relatively cheap. Examples of the aluminum plate include a pure aluminum plate and a plate of an aluminum alloy containing aluminum as a main component together with traces of other elements. A further example of the substrate is a plastic film laminated or vapor-deposited with aluminum. Examples of the other elements contained in the aluminum alloy include silicon, iron, manganese, copper, magnesium, chromium, zinc, bismuth, nickel, and titanium. The total content of the other elements in the aluminum alloy is 10% by weight or less. Although aluminum particularly desirable for use in the present invention is pure aluminum, the aluminum to be used in the present invention may contain small amounts of other elements, because limitations of purification technologies make production of perfectly pure aluminum difficult. Accordingly, composition of the aluminum plate for use in the present invention is not particularly limited, and a conventionally known aluminum plate may be used appropriately as a material in the present invention. The thickness of the aluminum plate for use in the present invention is about 0.1 to 0.6 mm, preferably 0.15 to 0.4 mm, and particularly preferably 0.2 to 0.3 mm.

Prior to surface-roughening of the aluminum plate, if necessary, a degreasing treatment is performed in order to remove any rolling oil from the surface of the aluminum plate by means of, for example, a surfactant, an organic solvent, an aqueous alkaline solution, or the like.

The surface-roughening of the aluminum plate may be performed by a variety of methods. Examples of these methods include a method wherein the surface is mechanically roughened, a method wherein the surface is roughened by being electrochemically dissolved, and a method wherein the surface is selectively dissolved in a chemical way. The mechanical methods may be conventionally known methods such as ball ablation, brushing, blasting, and buffing. One electrochemical method is electrolysis of the aluminum plate in an electrolyte solution, such as a hydrochloric acid or a nitric acid, using an a.c. current or a d.c. current. A combination of a mechanical method and an electrochemical method is also possible, as described in JP-A No. 54-63902.

If necessary, the surface-roughened aluminum plate is then subjected to an alkali-etching treatment and a neutralizing treatment that follows. After that, if desired, the aluminum plate is subjected to an anodizing treatment so as to increase water retention and wear resistance of the surface. A variety of electrolytes capable of producing a porous oxide layer can be used as an electrolyte for the anodizing treatment of the aluminum plate. Generally, sulfuric acid, phosphoric acid, oxalic acid, chromic acid, or a mixture of these acids is used as the electrolyte. The concentration of the electrolyte may be determined appropriately depending on the type of the electrolyte.

Conditions for anodizing vary depending on the type of electrolyte solutions employed and cannot be stipulated unqualifiedly. However, generally employed conditions are as follows: concentration of the electrolyte solution is 1 to 80% by weight; temperature of the solution is 5 to 70° C.; current density is 5 to 60 A/dm$^2$; voltage is 1 to 100V; and duration of electrolysis is 10 seconds to 5 minutes.

If the amount of an anodized layer is less than 1.0 g/m$^2$, plate life will be insufficient and non-image portions of a resulting planographic printing plate are liable to form scratch marks, which collect printing ink in printing operations to cause so-called "scratch smudging".

If necessary, a substrate whose surface is already anodized may be rendered hydrophilic by a surface treatment. Preferred examples of this surface treatment include treating the surface with an aqueous solution of an alkali metal silicate (such as sodium silicate) as described in U.S. Pat. Nos. 2,714,066, 3,181,461, 3,280,734, and 3,902,734, wherein the substrate is simply immersed or electrolytically treated in an aqueous solution of sodium silicate. Further examples are a treatment of the surface with an aqueous solution of potassium fluorozirconate as described in JP-B No. 36-22063 and a treatment of the surface with an aqueous solution of polyvinylsulfonic acid as described in U.S. Pat. Nos. 3,276,868, 4,153,461 and 4,689,272.

The planographic printing original plate of the present invention is prepared by forming the recording layer containing the image-forming material of the present invention on the substrate. If necessary, an undercoat layer may be formed between the recording layer and the substrate.

Various organic compounds may be used as components of the undercoat layer. Examples of an organic compound forming the undercoat layer include carboxymethyl cellulose; dextrin; gum arabic; phosphonic acids having an amino group, such as 2-aminoethylphosphonic acid and the like; organic phosphonic acids such as phenylphosphonic acid, naphthylphosphonic acid, alkylphosphonic acid, glycerophosphonic acid, methylenediphosphonic acid, ethylenediphosphonic acid, and the like, which may each have a substituent group; organic phosphoric acids such as phenylphosphoric acid, naphthylphosphoric acid, alkylphosphoric acid, glycerophosphoric acid, and the like, which may each have a substituent group; organic phosphinic acids such as phenylphosphinic acid, naphthylphosphinic acid, alkylphosphinic acid, glycerophosphinic acid, and the like, which may each have a substituent group; amino acids such as glycine, 1-alanine, and the like; and hydrochloric acid salts of amines having a hydroxyl group such as triethanolamine and the like. These compounds may be used singly or may be used in a combination of two or more.

The planographic printing original plate of the present invention may have a protective layer or the like, if necessary.

In the case where the aforementioned radical-polymerizable image-forming material is used for the recording layer, in order to prevent polymerization inhibition due to oxygen, an overcoat layer impermeable to oxygen may be disposed in a position adjacent to the recording layer. The material forming the overcoat layer is preferably a water-soluble resin such as polyvinyl alcohol, carboxymethyl cellulose, hydroxyethyl cellulose, methyl cellulose, polyvinylpyrrolidone, or the like. The proper thickness of the layer is about 0.2–3 $\mu$m.

If necessary, the overcoat layer may contain as a filtering agent a dye or a pigment which does not absorb light from a light source to be used for recording.

The planographic printing original plate prepared as described above is usually subjected to image-wise exposure and development.

Examples of a light source of actinic rays to be used for the image-wise exposure include a solid-state laser and a semiconductor laser, each emitting infrared rays having a wavelength of 720 to 1200 nm.

In the present invention, a light source emitting light whose wavelength ranges from a near-infrared region to a far-infrared region is preferable, and a solid-state laser or a semiconductor laser is particularly preferable.

A conventionally known aqueous alkaline solution can be used as a developing solution and also as a replenisher solution for the planographic printing original plate of the present invention. For example, the aqueous alkaline solution may contain an inorganic alkali salt such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide, or lithium hydroxide. In addition, an organic alkali can also be used for preparation of the aqueous alkaline solution. Examples of the organic alkali include monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These alkalis are used singly or in a combination of two or more.

Of the above-mentioned alkalis, a particularly preferred developing solution is an aqueous solution of a silicate, such as sodium silicate, potassium silicate, or the like. This is because adjustment of developing performance of the developing solution is possible, by varying a ratio of silicon oxide $SiO_2$ to alkali metal oxide $M_2O$, each of which forms the silicate, and concentrations thereof, in the solution. For example, the use of alkali metal silicates described in JP-A No. 54-62004 and JP-B No. 57-7427 is effective in the present invention.

When an automated developing machine is used, it is generally known that a replenishing system can be used to process a large amount of PS plates without exchanging the developing solution in the tank for a long period of time, by feeding the tank with an aqueous solution (a replenisher solution) having an alkali strength higher than that of the developing solution in the tank. This replenishing system is suited for the present invention. If necessary, the developing solution and the replenisher solution may contain a surfactant or an organic solvent for such purposes as acceleration or inhibition of development, dispersion of sludge resulting from development, and enhancement of affinity with ink of the image portions of the printing plate. Examples of preferred surfactants include anionic surfactants, cationic surfactants, nonionic surfactants, and amphoteric surfactants.

Further, if necessary, the developing solution and the replenisher solution may contain a reducing agent such as hydroquinone, resorcinol, or a sodium or potassium salt of an inorganic acid such as sulfite or hydrogensulfite; an organic carboxylic acid; a defoaming agent; and an agent to convert hard water into soft water.

The printing plate, after being processed with the developing solution and the replenisher solution described above, is subjected to a post-treatment such as a treatment with rinsing water, a treatment with a rinsing solution containing a surfactant or the like, or a treatment with a desensitizing solution containing gum arabic or a starch derivative. A combination of these treatments may be employed for post-treatment when the image-forming material of the present invention is used as a printing plate.

In recent years, for the purpose of rationalization and standardization of plate-making operations, automated developing machines have been widely used in the processing of materials for printing plates in the field of plate-making and the printing industry. Generally, the automated developing machine is made up of a developing section and a post-treating section, each including a device for transferring a printing plate and a tank filled with a processing solution and equipped with a spraying device, wherein the printing plate travels horizontally after exposure so as to be processed by the solution, which is sprayed from nozzles after being pumped up from the tank. Further, according to a new process, a printing plate is immersed in and transferred through a processing tank filled with a processing solution by means of immersed guide rolls or the like. In the above-mentioned automated processing, the processing can be performed by supplying replenisher solutions, in amounts in accordance with processed volume and operational period of time, to the processing solutions.

Further, a so-called single-use solution system, in which a printing plate is processed with a substantially unused processing solution, can also be employed in the present invention.

If unnecessary image portions (e.g., film edge marks of an original film) are found on a planographic printing plate which has been obtained by a procedure comprising image-wise exposure, developing, water-washing and/or rinsing, and/or gum coating, the unnecessary image portions are erased. The erasure is preferably performed by a process comprising coating the unnecessary image portions with an erasing solution, leaving the coating to remain on the unnecessary image portions for a predetermined period of time, and then removing the coating by washing with water, as described in JP-B No. 2-13293. In addition to this process, also possible is a process comprising irradiating the unnecessary image portions with actinic rays guided by an optical fiber and then developing, as described in JP-A No. 59-174842.

If it is desired to impart a higher level of plate life to the printing plate, the printing plate is subjected to a burning treatment.

When the printing plate undergoes the burning treatment, it is desirable to treat the printing plate with a counter-etching solution, which is described in, e.g., JP-B Nos. 61-2518 and 55-28062, and JP-A Nos. 62-31859 and 61-159655, prior to the burning treatment.

According to these treating methods, the planographic printing plate is coated with the counter-etching solution using a sponge or absorbent cotton soaked with the solution; the planographic printing plate is immersed in a vat filled with the counter-etching solution; or the planographic printing plate is coated with the counter-etching solution using an automated coater. If the coated amount is homogenized by squeezing or by means of squeezing rollers after the coating, a better result is obtained.

A suitable coating amount of the counter-etching solution is generally 0.03 to 0.8 g/m$^2$(dry weight).

The planographic printing plate, after being coated with the counter-etching solution, is dried and thereafter heated to a high temperature, if necessary, by means of a burning processor (e.g., BURNING PROCESSOR BP-1300 manufactured by Fuji Photo Film Co., Ltd.). Temperature and duration vary depending on the kinds of components constituting the image, but desirable temperatures and times are in a range of 180 to 300° C. and 1 to 20 minutes.

After the burning treatment, if necessary, the planographic printing plate may be subjected to conventionally employed treatments such as water-rinsing and gum-coating. However, if the counter-etching solution contains a water-soluble polymeric compound or the like, a so-called desensitizing treatment such as gum-coating may be omitted.

The planographic printing plate thus prepared is mounted on an offset printing machine or the like and is then used for printing a large number of sheets.

EXAMPLES

The present invention is further explained below by way of examples. However, it must be noted that the scope of the present invention is not limited to these examples.

Example 1

Examples of Positive-type Image-forming Materials
[Preparation of Substrate]

A 0.3 mm thick aluminum plate (type of material: 1050) was cleaned with trichloroethylene and grained with a nylon brush using an aqueous suspension of 400 mesh pumice powder. After being well rinsed with water, the aluminum plate was etched by a process of immersing the aluminum plate in a 25% aqueous solution of sodium hydroxide at 45° C. for 9 seconds, rinsing the aluminum plate with water, immersing the aluminum plate in a 20% aqueous solution of nitric acid for 20 seconds, and rinsing the aluminum plate with water. In the process, an etched amount of the grained aluminum plate was about 3 g/m$^2$. After the process, the aluminum plate was subjected to an anodizing process of immersing the aluminum plate in a 7% sulfuric acid solution as an electrolyte solution through which a d. c. current with a density of 15 A/dm$^2$ was passed. This process produced an anodized film of 3 g/m$^2$. Then, the surface-treated aluminum plate was rinsed with water and thereafter dried. The aluminum plate was then coated with an undercoat solution given below, and the coating was dried at 90° C. for 1 minute. After drying, a coated amount was 10 mg/m$^2$.

| Undercoat solution | |
|---|---|
| β-alanine | 0.5 g |
| methanol | 95 g |
| water | 5 g |

Next, the following coating liquid 1 for forming a photosensitive layer was coated on the substrates obtained in the above-described procedure with a coating amount of 1.8 g/m$^2$. In this way, a planographic printing original plate was obtained.

| [Coating liquid 1 for forming a photosensitive layer] | |
|---|---|
| m-cresol/p-cresol novolac | 1.0 g |
| (m to p ratio: 6:4; weight average molecular weight: 3,500; content of unreacted cresol: 0.5% by weight) | |
| infrared absorber (exemplary compound IR-1) | 0.2 g |
| dye prepared by using 1-naphthalenesulfonic acid anions as counter anions of VICTORIA PURE BLUE BOH | 0.02 g |

-continued

[Coating liquid 1 for forming a photosensitive layer]

| | |
|---|---|
| fluorine-based surfactant (MEGAFAC F-177, manufactured by Dainippon Ink and Chemicals, Inc.) | 0.05 g |
| γ-butyrolactone | 3 g |
| methyl ethyl ketone | 8 g |
| 1-methoxy-2-propanol | 7 g |

Examples 2 and 3

Planographic printing original plates were obtained in the same way as in Example 1, except that the infrared absorber incorporated in the coating liquid 1 for forming the photosensitive layer of Example 1 was replaced with infrared absorbers shown in Table 1.

Comparative Example 1

A planographic printing original plate was obtained in the same way as in Example 1, except that the infrared absorber incorporated in the coating liquid 1 for forming the photosensitive layer of Example 1 was replaced with IR-792 PERCHLORATE (manufactured by Sigma-Aldrich Japan Inc.) having the following structure.

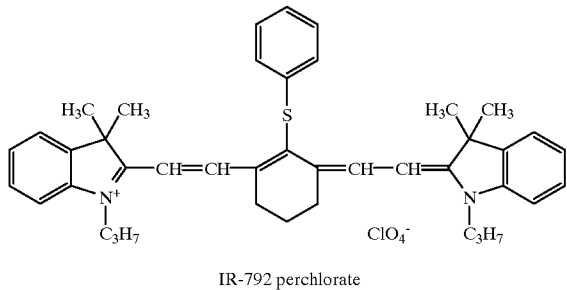

IR-792 perchlorate

Example 4

A substrate obtained in the same way as in Example 1 was coated with the following coating liquid 2 for forming a photosensitive layer with a coating amount of 1.6 g/m². In this way, a planographic printing original plate was obtained.

[Coating liquid 2 for forming a photosensitive layer]

| | |
|---|---|
| m-cresol/p-cresol novolac (m to p ratio: 6:4; weight average molecular weight: 3,500; content of unreacted cresol: 0.5% by weight) | 0.3 g |
| copolymer 1 obtained by the method described below (described in Examples of JP-A No. 11-348443) | 0.7 g |
| bis(4-hydroxyphenyl)sulfone | 0.1 g |
| infrared absorber (exemplary compound IR-1) | 0.15 g |
| p-toluenesulfonic acid | 0.002 g |
| dye prepared by using 1-naphthalenesulfonic acid anions as counter anions of VICTORIA PURE BLUE BOH | 0.02 g |
| fluorine-based surfactant (MEGAFAC F-177, manufactured by Dainippon Ink and Chemicals, Inc.) | 0.05 g |
| γ-butyrolactone | 8 g |
| methyl ethyl ketone | 8 g |
| 1-methoxy-2-propanol | 4 g |

The copolymer 1 was prepared according to the following method.

A 500 mL three-neck flask fitted with a stirrer, condenser, and dropping funnel was charged with 31.0 g (0.36 mol) of methacrylic acid, 39.1 g (0.36 mol) of ethyl chloroformate, and 200 mL of acetonitrile. The mixture was stirred while it was cooled in an ice water bath. 36.4 g (0.36 mol) of triethylamine was added dropwise from the dropping funnel to the mixture over a period of about 1 hour. After completion of the addition, the ice water bath was removed and the mixture was stirred for 30 minutes at room temperature.

51.7 g (0.30 mol) of p-aminobenzenesulfonamide was added to the reaction mixture and the mixture was stirred for 1 hour while the mixture was heated at 70° C. using an oil bath. After completion of a reaction, the mixture was poured into 1 L of water while the water was stirred. The mixture thus obtained was stirred for 30 minutes. A deposited substance was collected by filtration of the mixture. The deposited substance was then slurried in 500 mL of water. The slurry was filtered to obtain a solid substance. By drying the solid substance, a white substance, i.e., N-(p-aminosulfonylphenyl)methacrylamide, was obtained (46.9 g yield).

Next, a 100 mL three-neck flask fitted with a stirrer, condenser, and dropping funnel was charged with 5.04 g (0.0210 mol) of N-(p-aminosulfonylphenyl) methacrylamide, 2.05 g (0.0180 mol) of ethyl methacrylate, 1.11 g (0.021 mol) of acrylonitrile, and 20 g of N,N-dimethylacetamide. The mixture was stirred while being heated at 65° C. in a hot water bath. 0.15 g of "V-65" (manufactured by Wako Pure Chemical Industries, Ltd.) was added to the mixture and the resulting mixture was stirred for 2 hours under a nitrogen gas stream at 65° C. To this reaction mixture was added dropwise a mixture of 5.04 g of N-(p-aminosulfonylphenyl)methacrylamide, 2.05 g of ethyl methacrylate, 1.11 g of acrylonitrile, 20 g of N,N-dimethylacetamide, and 0.15 g of "V-65" from a dropping funnel over a period of 2 hours. After completion of a addition, the mixture was stirred for 2 hours at 65° C. After completion of a reaction, 40 g of methanol was added to the reaction mixture and the resulting mixture was cooled. The mixture thus obtained was poured into 2 L of water while the water was stirred. The mixture was stirred for 30 minutes. After that, a deposited substance was collected by filtration of the mixture. By drying the solid substance, 15 g of a white substance was obtained. The weight average molecular weight of the copolymer 1 thus obtained was measured by gel permeation chromatography (using a polystyrene standard) and was found to be 53,000.

Examples 5 and 6

Planographic printing original plates were obtained in the same way as in Example 4, except that the infrared absorber incorporated in the coating liquid 2 for forming the photosensitive layer in Example 4 was replaced with infrared absorbers shown in Table 1.

Comparative Example 2

A planographic printing original plate was obtained in the same way as in Example 4, except that the infrared absorber incorporated in the coating liquid 2 for forming a photosensitive layer in Example 4 was replaced with IR-792 PERCHLORATE (manufactured by Sigma-Aldrich Japan Inc.).

[Evaluation of Performance of the Planographic Printing Original Plates]

The planographic printing original plates of Examples 1~6 and the planographic printing original plates of Comparative Examples 1 and 2 obtained as above were subjected to the following tests to evaluate performances based on the following criteria. Test results are shown in Table 1.
(Sensitivity)

The planographic printing original plates obtained were exposed to a semiconductor laser having an output power of 500 mW, a wavelength of 830 nm, and a beam diameter of 17 μm ($1/e^2$) at a scanning speed of 5 m/second. After exposure, the presence or absence of ablation was visually inspected. The exposed plates were then developed using an automatic developing machine (PS PROCESSOR 900 VR manufactured by Fuji Photo Film Co., Ltd.) fed with a developing solution DP-4 and a rinsing solution FR-3 (diluted 1:7), all manufactured by Fuji Film Co., Ltd. In this test, DP-4 was diluted with water at a 1:8 dilution ratio. Next, line width in non-image portions obtained by using the developing solution was measured, the amount of laser radiation energy corresponding to the line width was sought, and this amount was treated as sensitivity. The values of sensitivity thus measured and presence or absence of ablation are shown in Table 1.

TABLE 1

|  | Infrared absorber | Sensitivity (mJ/cm$^2$) | Ablation |
|---|---|---|---|
| Example 1 | IR-1 | 175 | None |
| Example 2 | IR-14 | 175 | None |
| Example 3 | IR-48 | 170 | None |
| Comparative Example 1 | IR-792 PERCHLORATE | 210 | Found in traces |
| Example 4 | IR-1 | 165 | None |
| Example 5 | IR-20 | 160 | None |
| Example 6 | IR-46 | 150 | None |
| Comparative example 2 | IR-792 PERCHLORATE | 195 | Found in traces |

As can be seen from Table 1, it was found that the planographic printing original plates using the image-forming materials of the present invention have higher sensitivity, do not cause ablation, and are superior in image-forming performance in comparison with conventionally known planographic printing original plates that use infrared absorbers having only one chromophoric group.

Examples 7~10

Examples of Negative-type Image-forming Materials

[Coating Liquid 3 for Forming a Photosensitive Layer]

| [Coating liquid 3 for forming a photosensitive layer] | |
|---|---|
| diazonium salt (having the structural formula described below and described in JP-A No. 11-352679) | 0.15 g |
| infrared absorber (exemplary compound IR-1) | 0.10 g |
| poly-p-hydroxystyrene resin (having a weight average molecular weight of 10,000) | 1.5 g |
| crosslinking agent (having the structural formula shown below) | 0.50 g |
| fluorine-based surfactant | 0.03 g |
| methyl ethyl ketone | 15 g |
| 1-methoxy-2-propanol | 10 g |
| methyl alcohol | 5 g |

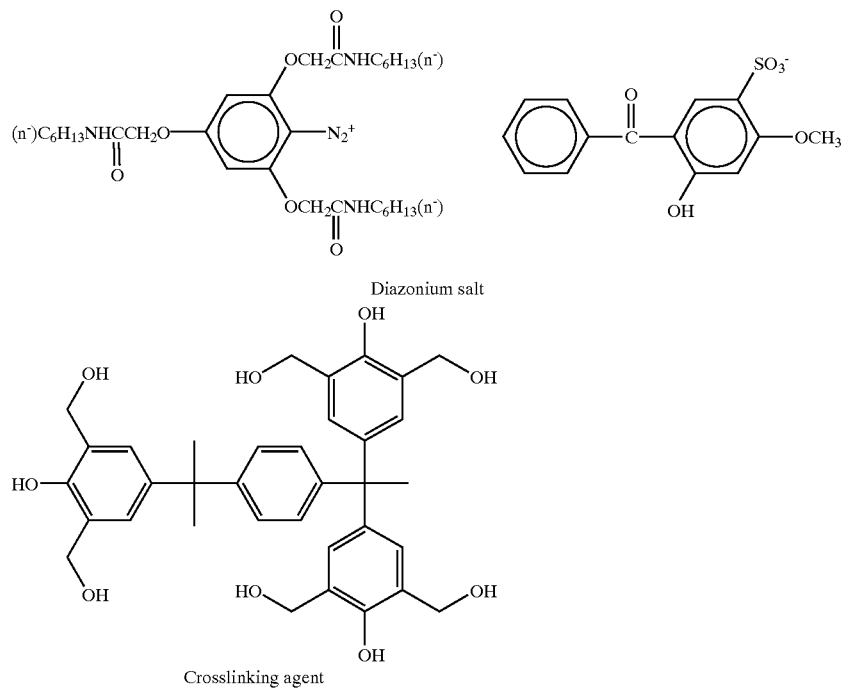

Diazonium salt

Crosslinking agent

The above-described diazonium salt was prepared in the following way.

2-nitrobenzene-1,3,5-triol (34 g), methyl chloroacetate (67 g), and potassium carbonate (80 g) were caused to react in N,N-dimethylacetamide (300 mL) at 80° C. for 5 hours. After completion of the reaction, the reaction product was extracted with ethyl acetate and solvent was removed from the extract by distillation. A residue was treated by silica gel column chromatography. In this way, methyl 2-(3,5-bis ((methoxycarbonyl)methoxy)-2-nitrophenoxy)acetate (45 g) was obtained.

Methyl 2-(3,5-bis((methoxycarbonyl)methoxy)-2-nitrophenoxy)acetate (39 g) thus obtained and n-hexylamine (156 g) were caused to react in toluene (300 mL) at 100° C. for 20 hours. After completion of the reaction, the solvent was removed from the reaction mixture by distillation. Next, ethyl acetate (300 mL) was added to a residue and the reaction mixture was heated at a refluxing temperature and filtered. To a mixture of the obtained compound and 2-propanol (300 mL) were added reduced iron (39 g) and an aqueous solution of ammonium chloride (7.6 g of ammonium chloride/30 mL of water) and the mixture was caused to react at 90° C. for 5 hours. After completion of the reaction, a reaction product was extracted with dichloromethane. The extract was treated by silica gel column chromatography.

The obtained compound was dissolved in methanol (200 mL). After the solution was acidified with concentrated hydrochloric acid (9 g), an aqueous solution of sodium sulfite (3.1 g of sodium sulfite/15 mL of water) was gradually added to the acidified solution as the same was being cooled. Two hours later, 2-hydroxy-4-methoxybenzophenole-5-sulfonic acid (10 g) was added, and, one hour later, a reaction product was extracted with dichloromethane. The extract was washed with water and solvent was removed by distillation. In this way, the desired diazonium salt was obtained.

A substrate obtained in the same way as in Example 1 was coated with the coating liquid, and the coating was dried at 100° C. for 1 minute to thereby obtain a negative-type, planographic printing original plate [C-1] for Example 7. Coated amounts after drying were 1.3 g/m².

Planographic printing original plates [C-2]~[C-4] for Examples 8 to 10 were obtained in the same way as in Example 7, except that the kind of the infrared absorber was changed as shown in Table 2.

The negative-type planographic printing original plates [C-1]~[C-4] thus obtained were exposed using a semiconductor laser emitting infrared rays having a wavelength of 830 nm, i.e., the same wavelength as for Example 1. After exposure, the plates [C-1]~[C-4] were subjected to a heat treatment for 1 minute in an oven at 140° C. The exposed plates were processed using the automatic developing machine fed with the developing solution DP-4 (diluted 1:8) and the rinsing solution FR-3 (diluted 1:7), both manufactured by Fuji Film Co., Ltd. All of the planographic printing original plates [C-1]~[C-4] provided good negative images.

Comparative Example 3

A negative-type planographic printing original plate [C—C] was obtained in the same way as in Examples 7~10, except that the infrared absorber incorporated in the coating liquid 3 for forming the photosensitive layer in Examples 7~10 was replaced with IR-792 PERCHLORATE.

The planographic printing original plate [C—C] thus obtained was exposed, heat-treated, and developed as in Examples 7~10. After that, the sensitivity was measured and ablation was inspected for the same way as in Examples 1~6. The results are shown in Table 2.

TABLE 2

| | Plate material | Infrared absorber | Sensitivity (mJ/cm²) | Ablation |
| --- | --- | --- | --- | --- |
| Example 7 | C-1 | IR-1 | 135 | None |
| Example 8 | C-2 | IR-13 | 125 | None |
| Example 9 | C-3 | IR-42 | 115 | None |
| Example 10 | C-4 | IR-48 | 120 | None |
| Comparative Example 3 | C-C | IR-792 PERCHLORATE | 155 | Found in traces |

As can be seen from Table 2, it was found that, also in planographic printing original plates using the negative-type image-forming materials, planographic printing original plates using the infrared absorbers of the present invention have higher sensitivity, do not cause ablation, and are superior in image-forming performance in comparison with a conventionally known planographic printing original plate using a conventionally known infrared absorber.

Examples 11~12

Examples of Negative-Type Image-Forming Materials

| [Coating liquid 4 for forming a photosensitive layer] | |
| --- | --- |
| iodonium salt having the structural formula shown below | 0.67 g |
| infrared absorber (exemplary compound IR-1) | 0.27 g |
| allyl methacrylate/methacrylic acid copolymer | 3.3 g |
| (molar ratio: 87:13, MW = 100,000) | |
| dipentaerythritol hexaacrylate | 3.3 g |
| (DPHA, manufactured by Nippon Kayaku Co., Ltd.) | |
| dye prepared using 1-naphthalenesulfonic acid anions as counter anions of VICTORIA PURE BLUE BOH | 0.13 g |
| fluorine-based surfactant | 0.1 g |
| (MEGAFAC F-177, manufactured by Dainippon Ink and Chemicals Inc.) | |
| methyl ethyl ketone | 33 g |
| 1-methoxy-2-propanol | 20 g |
| methyl alcohol | 26 g |

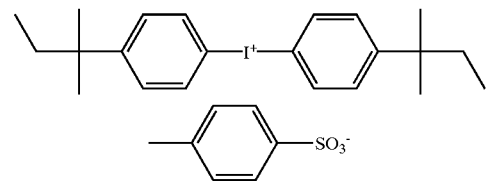

Iodonium salt

A substrate obtained in the same way as in Example 1 was coated with the coating liquid 4, and the coating was dried at 115° C. for 45 seconds to thereby obtain a negative-type planographic printing original plate [D-1] for Example 11. The coated amount after drying was 1.4 g/m².

A planographic printing original plate [D-2] for Example 12 was obtained in the same way as in Example 11, except that the kind of the infrared-ray absorber was changed as shown in Table 3.

The planographic printing original plates [D-1] and [D-2] thus obtained were exposed using a semiconductor laser emitting infrared rays having a wavelength of 830 nm, i.e., the same wavelength as for Examples 1~10. After exposure, the planographic printing original plates [D-1] and [D-2] were processed using the automatic developing machine fed with a developing solution DN-3C (diluted 1:2) and the rinsing solution FR-3 (diluted 1:7), both manufactured by Fuji Film Co., Ltd. Both of the planographic printing original plates [D-1] and [D-2] provided good negative images.

Comparative Example 4

A negative-type planographic printing original plate [D-C] was obtained in the same way as in Examples 11 and 12, except that the infrared absorber incorporated in the coating liquid 4 for forming a photosensitive layer in Examples 11 and 12 was replaced with IR-786 PERCHLORATE (manufactured by Sigma-Aldrich Japan Inc.).

The planographic printing original plate [D-C] thus obtained was exposed, heat-treated, and developed as in Examples 11 and 12. After that, sensitivity was measured and ablation was inspected in the same way for Examples 1~10. The results are shown in Table 3.

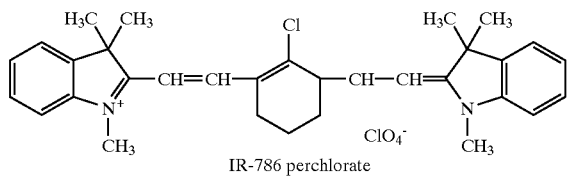

IR-786 perchlorate

TABLE 3

| | Plate material | Infrared absorber | Sensitivity (mJ/cm$^2$) | Ablation |
|---|---|---|---|---|
| Example 11 | D-1 | IR-6 | 160 | None |
| Example 12 | D-2 | IR-48 | 155 | None |
| Comparative example 4 | D-C | IR-786 PERCHLORATE | 175 | Found in traces |

As can be seen from Table 3, it was found that the planographic printing original plates of Examples 11 and 12 have higher sensitivity, do not cause ablation, and are superior in image-forming performance in comparison with a conventionally known planographic printing original plate that uses an infrared absorber having only one chromophoric group.

As can be seen from the Examples described above, the use of a specific infrared absorber makes it possible to obtain an image-forming material which has high sensitivity, inhibits the formation of ablation, and exhibits good image-forming performance.

In addition, it was found that a planographic printing original plate using this image-forming material could be engraved in a direct plate-making process using an infrared laser and exhibited high sensitivity and good image-forming performance.

The image-forming material of the present invention has high sensitivity to an infrared laser and is excellent in image-forming performance. A planographic printing original plate using this image-forming material can be engraved in a direct plate-making process using an infrared laser, exhibits high sensitivity and a good image-forming performance, and does not produce smudges on an optical system of an exposing apparatus.

What is claimed is:

1. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond and a polymeric compound insoluble in water and soluble in an aqueous alkaline solution, wherein image recording can be effected by utilizing a change of solubility of the polymeric compound in the aqueous alkaline solution.

2. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond and a radical generator which is caused to generate a radical by at least heat, and a polymerizable compound which reacts with the radical in a radical polymerization reaction, wherein image recording can be effected by utilizing curing caused by the radical polymerization reaction of the polymerizable compound.

3. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond, an acid-generating agent which is caused to generate an acid by at least heat, and a compound which crosslinks, with the acid acting as a catalyst for a crosslinking reaction, wherein image recording can be effected by utilizing a decrease of alkali-solubility of the image-forming material.

4. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond, an acid-generating agent which is caused to generate an acid by at least heat, and a compound that severs a chemical bond, with the generated acid acting as a catalyst for a bond cleaving reaction, wherein image recording can be effected by utilizing an increase of alkali-solubility of the image-forming material.

5. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond and a polarity switchable material whose hydrophilicity and hydrophobicity are changed by at least heat, wherein image recording can be effected by utilizing change of the hydrophilicity and hydrophobicity of the image-forming material.

6. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond wherein the infrared radiation absorber is included in a proportion of from 0.01 to 50% by weight with respect to total weight of solid components of the image-forming material.

7. An image-forming material according to claim 6, wherein the infrared radiation absorber is represented by the following general formula I:

General formula I :

$$(D)_n-A$$

wherein A represents an organic group having a valency of at least 2; n represents an integer of at least 2; and D represents a chromophoric group having absorption in an infrared region, wherein one of the chromophoric groups may be the same as and may be different from another of the chromophoric groups; and, in a case where the chromophoric group has an electric charge, an ion having an electric charge opposite to the electric charge of the chromophoric group may be present in order to neutralize the electric charge of the chromophoric group.

8. A planographic printing original plate comprising a substrate, and a recording layer provided on the substrate, the recording layer containing the image-forming material of claim 6.

9. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond wherein the infrared radiation absorber is included in a proportion of from 0.1 to 20% by weight with respect to total weight of solid components of the image-forming material.

10. An image-forming material capable of recording an image by infrared exposure, wherein the image-forming material contains an infrared radiation absorber having in a molecule thereof at least two chromophoric groups, each of which can absorb an infrared ray and is bonded to another portion of the molecule by a covalent bond wherein the infrared radiation absorber is included in a proportion of from 0.5 to 15% by weight with respect to total weight of solid components of the image-forming material.

* * * * *